United States Patent
Gore et al.

(10) Patent No.: US 7,616,711 B2
(45) Date of Patent: Nov. 10, 2009

(54) FREQUENCY DOMAIN FILTERING TO IMPROVE CHANNEL ESTIMATION IN MULTICARRIER SYSTEMS

(75) Inventors: Dhananjay Ashok Gore, San Diego, CA (US); Avneesh Agrawal, San Diego, CA (US); Aamod Khandekar, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 11/022,360

(22) Filed: Dec. 22, 2004

(65) Prior Publication Data

US 2006/0018393 A1 Jan. 26, 2006

Related U.S. Application Data

(60) Provisional application No. 60/589,817, filed on Jul. 20, 2004.

(51) Int. Cl.
*H03D 1/00* (2006.01)
*H04L 27/06* (2006.01)

(52) U.S. Cl. .................. 375/340; 375/224; 375/285; 375/296; 375/350

(58) Field of Classification Search .................. 375/224, 375/227, 285, 296, 340, 346, 348, 350; 370/241, 370/252, 491, 500
See application file for complete search history.

(56) References Cited

U.S. PATENT DOCUMENTS

| | | | |
|---|---|---|---|
| 4,320,399 A * | 3/1982 | Buck et al. .................. 342/204 |
| 5,479,447 A * | 12/1995 | Chow et al. .................. 375/260 |
| 6,154,443 A * | 11/2000 | Huang et al. ................. 370/210 |
| 6,353,636 B1 * | 3/2002 | Tate et al. .................... 375/260 |
| 6,473,394 B1 | 10/2002 | Marchok et al. |
| 6,498,805 B1 * | 12/2002 | Brown et al. ................. 375/147 |
| 6,618,352 B1 * | 9/2003 | Shirakata et al. ............. 370/203 |

(Continued)

FOREIGN PATENT DOCUMENTS

EP 1414177 4/2004

(Continued)

OTHER PUBLICATIONS

International Search Report - PCT/US05/024613, International Searching Authority - European Patent Office, Oct. 27, 2005.
Written Opinion - PCT/US05/024613, International Searching Authority - European Patent Office, Oct. 27, 2005.
International Preliminary Report on Patentability - PCT/US05/024613, IPEA/US - Alexandria VA, Oct. 10, 2006.

*Primary Examiner*—Jean B Corrielus
(74) *Attorney, Agent, or Firm*—Sandip S. Minhas; James K O'Hare

(57) ABSTRACT

A channel estimation system comprises a filtering component that selectively scales a plurality of carriers as a function of location of the plurality of carriers within a frequency band, wherein the plurality of carriers comprises at least one data carrier and at least one pilot carrier. A component thereafter extrapolates an observation from the at least one pilot carrier, wherein a channel is estimated as a function of the extrapolated observation. The scaling of the carriers facilitates reducing a flooring effect associated with channel estimation. The filtering component can be employed at a transmitter and/or at a receiver, and can be activated and/or deactivated as a function of a sensed data packet type.

76 Claims, 11 Drawing Sheets

U.S. PATENT DOCUMENTS

| | | | | |
|---|---|---|---|---|
| 6,816,453 B1* | 11/2004 | Sakamoto | | 370/210 |
| 6,925,128 B2* | 8/2005 | Corral | | 375/260 |
| 6,931,050 B1* | 8/2005 | Bottomley | | 375/130 |
| 6,990,153 B1* | 1/2006 | Farhang-Boroujeni et al. | | 375/260 |
| 7,009,932 B2* | 3/2006 | Matheus et al. | | 370/208 |
| 7,012,955 B2* | 3/2006 | Lee et al. | | 375/224 |
| 7,142,865 B2* | 11/2006 | Tsai et al. | | 455/452.1 |
| 7,145,940 B2* | 12/2006 | Gore et al. | | 375/147 |
| 7,170,880 B2* | 1/2007 | Webster et al. | | 370/338 |
| 2002/0085640 A1* | 7/2002 | Humphrey | | 375/260 |
| 2002/0150154 A1 | 10/2002 | Warke et al. | | |
| 2003/0104797 A1 | 6/2003 | Webster et al. | | |
| 2003/0112825 A1* | 6/2003 | Wang et al. | | 370/491 |
| 2003/0123530 A1* | 7/2003 | Maeda et al. | | 375/148 |
| 2003/0174643 A1* | 9/2003 | Ro et al. | | 370/210 |
| 2004/0086054 A1* | 5/2004 | Corral | | 375/260 |
| 2004/0127245 A1* | 7/2004 | Sadri et al. | | 455/522 |
| 2005/0031047 A1* | 2/2005 | Maltsev et al. | | 375/260 |
| 2005/0032514 A1* | 2/2005 | Sadri et al. | | 455/423 |
| 2005/0135312 A1* | 6/2005 | Montojo et al. | | 370/335 |
| 2006/0018393 A1* | 1/2006 | Gore et al. | | 375/260 |

FOREIGN PATENT DOCUMENTS

| | | |
|---|---|---|
| EP | 1521413 | 4/2005 |
| RU | 2157050 | 9/2000 |
| WO | 96017454 | 6/1996 |

* cited by examiner

FREQUENCY DOMAIN FILTERING TO IMPROVE CHANNEL ESTIMATION IN MULTICARRIER SYSTEMS

REFERENCE TO RELATED APPLICATION

This application claims the benefit of U.S. Provisional Application Ser. No. 60/589,817 filed on Jul. 20, 2004, and entitled MISCELLANEOUS CHANNEL ESTIMATION ISSUES, the entirety of which is incorporated herein by reference.

BACKGROUND

I. Field

The following description relates generally to wireless communications, and more particularly to techniques for improved channel estimation.

II. Background

In the not too distant past mobile communication devices in general, and mobile telephones in particular, were luxury items only affordable to those with substantial income. Further, these mobile telephones were of substantial size, rendering them inconvenient for extended portability. For example, in contrast to today's mobile telephones (and other mobile communication devices), mobile telephones of the recent past could not be placed into a user's pocket or handbag without causing such user extreme discomfort. In addition to deficiencies associated with mobile telephones, wireless communications networks that provided services for such telephones were unreliable, covered insufficient geographical areas, were associated with inadequate bandwidth, and various other deficiencies.

In contrast to the above-described mobile telephones, mobile telephones and other devices that utilize wireless networks are now commonplace. Today's mobile telephones are extremely portable and inexpensive. For example, a typical modern mobile telephone can easily be placed in a handbag without a carrier thereof noticing existence of the telephone. Furthermore, wireless service providers often offer sophisticated mobile telephones at no cost to persons who subscribe to their wireless service. Numerous towers that transmit and/or relay wireless communications have been constructed over the last several years, thus providing wireless coverage to significant portions of the United States (as well as several other countries). Accordingly, millions (if not billions) of individuals own and utilize mobile telephones.

The aforementioned technological advancements are not limited solely to mobile telephones, as data other than voice data can be received and transmitted by devices equipped with wireless communication hardware and software. For instance, several major metropolitan areas have implemented or are planning to implement citywide wireless networks, thereby enabling devices with wireless capabilities to access a network (e.g., the Internet) and interact with data resident upon such network. Moreover, data can be exchanged between two or more devices by way of a wireless network. Given expected continuing advancement in technology, a number of users, devices, and data types exchanged wirelessly can be expected to continue to increase at a rapid rate. Due to such increase in use, however, networking protocols currently employed to transmit data are quickly becoming inadequate.

Orthogonal Frequency Division Modulation or Orthogonal Frequency Division Multiplexing (OFDM) is one exemplary protocol that is currently utilized in wireless environments to transmit and receive data. OFDM modulates digital information onto an analog carrier electromagnetic signal, and is utilized, for example, in IEEE 802.11a/g WLAN standard. An OFDM baseband signal (e.g., a subband) constitutes a number of orthogonal subcarriers, where each subcarrier independently transmits its own modulated data. Benefits of OFDM over other conventional wireless communication protocols include ease of filtering noise, ability to vary upstream and downstream speeds (which can be accomplished by way of allocating more or fewer carriers for each purpose), ability to mitigate effects of frequency-selective fading, etc.

In order to effectively communicate in a wireless environment, an accurate estimate of a physical (wireless) channel between a transmitter and receiver is typically needed. This estimation allows a receiver to obtain data delivered from a transmitter on various available subcarriers. Channel estimation is generally performed by delivering a pilot symbol to a receiver, wherein the pilot symbol is associated with modulation symbols known to such receiver. Accordingly, a channel response can be estimated as a ratio of a received pilot symbol over a transmitted pilot symbol for subcarriers utilized in pilot transmission. One exemplary conventional manner of obtaining a channel estimate is to assume a channel length (e.g., by utilizing a cyclic prefix), and thereafter analyze a number of observations in the frequency domain that relates to a number of observations required for adequate channel estimation in the temporal domain. More specifically, a defined number of pilot tones provide a number of observations of the channel in the frequency domain. Thereafter, a linear transformation can be applied to observations relating to the pilot tones in order to obtain corresponding observations in the temporal domain. In one particular example, an Inverse Fast Fourier Transform (IFFT) can be applied to observations relating to the pilot tones. Upon receiving the observations in the temporal domain, all such pilot observations can be averaged (with respect to each symbol instant upon the pilot carriers) to obtain an estimate of the physical channel.

In certain cases, the above-described channel estimation technique can lead to an irreducible noise floor that in turn can affect decoder performance. While this noise floor may not be significant enough to cause problems for most conventional data packets and/or modulating operations, it can cause performance degradation in the decoding of packets with high spectral efficiency (e.g., packet formats utilizing 64 QAM modulation that operate in conditions with high signal to noise ratio). Thus, conventional channel estimation systems and/or methodologies are frequently ineffective for such data packet formats.

In view of at least the above, there exists a need in the art for a system and/or methodology for mitigating flooring in connection with channel estimation given a high-level data packet.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

The disclosed embodiments relate to reducing channel estimation error in general, and more particularly to mitigating a flooring effect that occurs with respect to conventional channel estimation systems/methodologies. Improved channel estimation can be implemented by way of scaling contributions of carriers within a band. More specifically, contributions of carriers near edges of a band are scaled less than contributions of carriers near a center of the band. Overall system performance is improved due to lowering of a noise floor with respect to a vast majority of the band.

To effectuate this scaling, a filtering mechanism can be utilized at a receiver and/or a transmitter. The filtering mechanism can be applied exclusively within the frequency domain thereby enabling high flexibility in implementation. In particular, if the filtering mechanism is associated with a receiver, observations can be obtained from data carriers and pilot carriers (e.g., data/pilot carriers can carry data/pilot symbols, and observations relating thereto can be acquired). The filtering mechanism at the receiver can simply scale the carriers by applying multipliers to such carriers, wherein the multipliers are selected based at least in part upon a position of carriers within a frequency band. Carriers proximate to an edge of a band are scaled down more than carriers proximate to a center of a band. Thus, disparate carriers will be associated with disparate power levels upon filtering. Accordingly, observations obtained from such carriers will likewise be selectively scaled. Moreover, the filtering mechanism can be selectively activated and/or deactivated depending upon a data packet type being demodulated. For instance, conventional channel estimation techniques are generally adequate with respect to low-level data packets, such as data packets modulated by way of 16 QAM. Thus, if a low-level data packet is being demodulated at the receiver, the filtering mechanism can be deactivated. With respect to high-level data packets, however, conventional channel estimation systems/methodologies are inadequate due to a flooring effect. Therefore, if a 64 QAM packet is received and recognized, the filtering mechanism can be activated. Upon selectively scaling the observations from both data and pilot carriers, observations retained from the pilot carriers are extrapolated and utilized for channel estimation.

As stated above, the filtering mechanism can also be applied at a transmitter. Thus, a pulse-shaping function can be utilized to effectively shape a transmit spectrum, thereby effectively applying less power to carriers (e.g., both data and pilot carriers) proximate to a band edge and more power to carriers proximate to a center of a band. For example, a raised cosine filter can be employed to shape a transmit spectrum to facilitate scaling observations obtained therefrom. While applying the filtering mechanism at the transmitter can improve performance of a communication system (e.g., an OFDM, OFDMA, CDMA, TDMA, GSM, . . . system), such filter is not as flexible when compared to a filtering mechanism associated with a receiver, as the particular transmit filter employed at the transmitter is forced onto all users supported in that transmission. These users typically experience different propagation channels and may require different filters and/or not require filtering. If the filter is implemented at the receiver, it allows great flexibility since it can be activated and/or deactivated at will by each user depending on context of use.

The scaled pilot observations can thereafter be subject to linear transformation (e.g., an IFFT-FFT operation), thus facilitating obtainment of a full frequency channel estimate. To render such linear transformations efficient, the number of pilot carriers within a band can be selected to be a power of two and be equi-spaced in the band. This pilot structure allows the linear transformation to be represented, for example, as an IFFT-FFT operation. In accordance with one exemplary embodiment, assumptions can be made with respect to observations relating to pilot carriers that fall within guardbands. For example, in OFDM systems guardbands are defined at edges of a frequency spectrum, wherein no communications are undertaken within such guardbands. Extrapolation algorithms can be utilized to determine pilot carrier(s) within the guardbands, and observations relating thereto can be assumed to be a particular value. For example, the assumed value can be zero. Such assumption retains an observation structure that enables an IFFT-FFT operation to be completed in a mathematically elegant manner.

In accordance with another exemplary embodiment, a method for reducing channel estimation error in a wireless communication environment is provided, wherein the method comprises selectively scaling a data carrier and a pilot carrier within a frequency band, the data carrier and pilot carrier scaled as a function of a location within the band of the data carrier and pilot carrier, obtaining an observation relating to the scaled pilot carrier, and estimating a channel as a function of the obtained observation. Further, a channel estimation system is described herein, wherein the system comprises a filtering component that selectively scales a plurality of carriers within a frequency domain as a function of location of the plurality of carriers within a frequency band, the plurality of carriers comprises at least one data carrier and at least one pilot carrier, and a component that extrapolates an observation from the at least one pilot carrier, a channel estimated as a function of the extrapolated observation.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
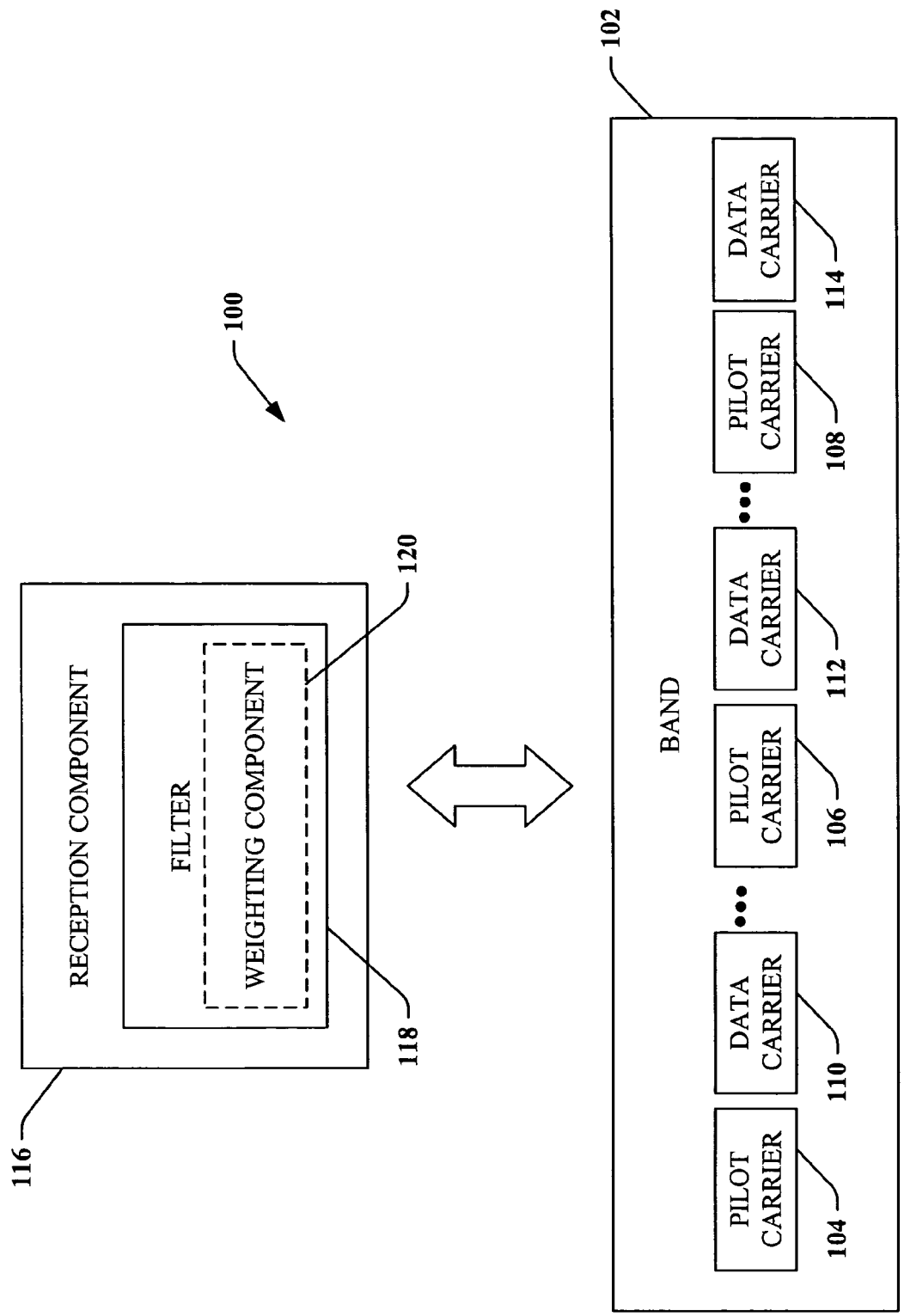
FIG. 1 is a high-level block diagram of an exemplary embodiment of a system that reduces a flooring effect associated with channel estimation.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing these embodiments.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In accordance with one or more embodiments and corresponding disclosure thereof, various aspects are described in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Referring now to the drawings, FIG. 1 illustrates a high-level system overview in connection with one exemplary embodiment. The exemplary embodiment relates to a novel system 100 that facilitates mitigation of flooring effects associated with channel estimation in a wireless communications environment. For example, channel estimation is often necessary to enable adequate data packet receipt/transmittal between devices (e.g., a base station and a unit) at desirable rates within an orthogonal frequency division multiplexing (OFDM) communication system, as well as other systems (e.g., CDMA, TDMA, GSM, . . . ). Conventionally, channel estimation techniques may introduce a noise floor. For conventional and low-level data packets, this noise floor is not problematic, as the floor typically occurs at a disparate operating level than a level of operation associated with communication of the data packets (e.g., the introduced noise floor could be much smaller than additive thermal noise). For high-level data packets, however, this noise floor may be comparable or higher than the additive thermal noise and dominate decoder performance, thus reducing operation efficiency of a communication network.

The system 100 includes a communication band 102 (e.g., a spectrum of wireless communication frequencies) that can conform to a scheme utilized in wireless communication systems (e.g., OFDM, OFDMA, CDMA, TDMA, . . . ). In particular, the band 102 can be partitioned into a plurality of orthogonal subcarriers, wherein each of the subcarriers can be modulated with data relating to such subcarriers. In particular, the band 102 includes one or more pilot carriers 104-108 that are employed to carry pilot symbols that are known by a receiving unit. Therefore, by way of comparing values of known pilot symbols with values measured relating to the pilot symbols, various delays, fading, and the like can be estimated for a communication channel. In accordance with one exemplary embodiment, the pilot carriers 104-108 can be equally spaced amongst a plurality of data carriers 110-114 employed for transmission of symbols of which a receiver has no prior knowledge. For instance, if the band 102 includes 512 total carriers and 32 of such carriers are defined as the pilot carriers 104-108, then there are 15 data carriers between every two consecutive pilot carriers. Furthermore, it is understood that it is not necessary to fix position of the pilot carriers 104-108 amongst the data carriers 110-114; rather, such pilot carriers 104-108 can change according to an algorithm and/or parameter. For example, positions of the pilot carriers 104-108 can be altered according to a particular increment, according to a randomizer and/or pseudorandom algorithm, or any other suitable manner for altering position of the pilot carriers 104-108.

The band 102 in general, and the pilot carriers 104-108 and the data carriers 110-114 in particular, are received by a reception component 116. The reception component 116 can be, for example, a receiver or a transmitter. Moreover, the reception component 116 can be associated with a cellular phone, a pager, a PDA, a laptop computer, a tower, a satellite, or any other suitable devices utilized in a wireless network. The reception component 116 includes a filter 118 that is employed to mitigate flooring effects associated with channel estimation. The filter 118 accomplishes this by way of utilizing a weighting component 120 to selectively scale the pilot carriers 104-108 and the data carriers 110-114. In particular, the weighting component 114 selectively weights the pilot carriers 104-108 and the data carriers 110-114 according to a position of the pilot carriers 104-108 and the data carriers 110-114 within the band 102. For instance, pilot carriers 104-108 and/or data carriers 110-114 proximate to an edge of the band 102 can be weighted down more (without being weighted to zero) when compared with pilot carriers 104-108 and data carriers 110-114 positioned towards a center of the band 102.

Such selective weighting of the pilot carriers 104-108 and the data carriers 110-114 facilitates lowering a noise floor associated with conventional channel estimation systems within wireless communication networks (e.g., OFDM, OFDMA, CDMA, TDMA, . . . ). In particular, channel estimation is employed to estimate a channel in the frequency domain, and to acquire such estimate an estimate of the channel in the time domain is first obtained. Time domain estimates can be acquired by receiving symbol observations relating to the scaled pilot carriers 104-108 and performing a linear transformation thereon. For example, matrix multiplication can be utilized in connection with obtaining an estimate of a channel in the time domain. Thus, the pilot carriers 104-108 are extracted from the band, and observations relating to these extracted observations can be employed for channel estimation purposes. Such scaling of the carriers (both the pilot carriers 104-108 and the data carriers 110-114) within the band is an effort to artificially enforce continuity across edges of the band 102. In one particular implementation, an Inverse Fast Fourier Transform (IFFT) can be performed upon the observations obtained from the pilot carriers 104-108. The observations can be collected over time and averaged, and thereafter be subjected to a Fast Fourier Transform (FFT), thus providing a channel estimate in the frequency domain. It is to be noted, however, that any suitable linear transformation can be employed, and such linear transformations are contemplated by the inventor. Noise suppression and time filtering can also be utilized to obtain an adequate channel estimate. While this process may be sufficient for most data packets, data packets that operate at high spectral efficiency (high signal to noise ratio) may be subject to a noise floor introduced in the channel estimation procedure.

This flooring effect in conventional channel estimation systems is a fundamental problem in wireless communication networks (and particularly in OFDM systems), and is at least partially caused by parameters relating to linear processing. More specifically, linear processing devices (e.g., FFT and IFFT operations) force a channel to be continuous across an entirety of a band (IFFT-FFT outputs must be continuous). Continuity, however, is not necessarily a trait of a band in a wireless communications system. For instance, a single tap channel may be received precisely at a chip delay, thus being associated with the single tap. Accordingly, the channel is continuous both in phase and amplitude across edges of the band 102—therefore, an IFFT-FFT routine on observations relating to the band will operate desirably. If, however, the same tap were altered (e.g., the channel is received at half-chip spacing), the equivalent channel may have a plurality of taps. The aforementioned scenario can cause the amplitude across edges of the band 102 to be constant but be associated with discontinuous phases. In general, when the channel impulse response constitutes multiple taps, the frequency response of the channel need not be continuous in amplitude or phase across the edges of the band. When an IFFT-FFT routine (or other suitable linear transformation mechanism(s)) is utilized for channel estimation on observations relating to the discontinuous phases, the routine forces continuity across the edges of the band 102, thereby causing a noise floor.

Discontinuity at an edge of the band 102 can further be a result of guardbands existent in, for example, OFDM subcarrier structures. In particular, the band 102 in an OFDM system will be associated with guardbands (not shown) at the edges of the band 102, wherein no communications take place within such guardbands. Accordingly, one or more of the pilot carriers 104-108 can fall within the guardbands, but the equispaced structure and number of guardbands is desirably undisturbed due to mathematical elegance associated with linear transformation procedure(s) (e.g., an IFFT procedure). Conventionally, to maintain the structure of the pilot carriers 104 within the band 102, rather than simply dismissing observations relating to the pilot carrier(s) within the guardband(s), observations acquired from pilot carrier(s) within the guardbands are extrapolated to some value (e.g., they can be assumed to be zero). This, however, represents discontinuity at edges of the band 102; when, for example, an IFFT is performed on such observations, outputs of the IFFT must be continuous. Therefore, channel estimation errors at the edge of the band 102 resultant from forced continuity can permeate throughout such band 102, resulting in the aforementioned flooring effect. In summary, the noise floors exist towards a center portion of the band 102 due at least in part to discontinuity and errors at edges of the band 102.

The system 100 employs the filter 118 and the weighting component 120 to selectively weight the data carriers 110-114 and pilot carriers 104-108 within the band. More specifically, observations obtained from the pilot carriers 104-108 and the data carriers 110-114 at an edge of the band 102 are weighted down compared to observations obtained from pilot carriers 104-108 and data carriers 110-114 near the center of the band 102. This filtering may be understood as an attempt to artificially enforce continuity at the band edge. A result of such weighting is a reduced noise floor with respect to a vast majority of the band 102. Performance relating to a channel utilizing this selective weighting, however, improves when high-level data packets (e.g. 64 QAM packets) are delivered over the channel. This improvement can be attributed to reduction of the noise floor with respect to a vast majority of subcarriers within the band 102.

In accordance with one exemplary embodiment relating to the system 100, the filter 118 and weighting component 120 can be activated upon receipt of a data packet modulated by way of 64 QAM. QAM is encoding of information into a carrier wave by variation of amplitude of both the carrier wave and a quadrature carrier that is ninety degrees out of phase with a main carrier in accordance with two input signals. In other words, amplitude and phase of a carrier wave are altered according to information desirably transmitted, wherein the alteration occurs at a substantially similar time. 64 QAM data packets are becoming common with respect to high-speed modem applications. While 64 QAM data packets are provided as an exemplary data packet, it is to be understood that any suitable data packet that operates at a high spectral efficiency can benefit from one or more embodiments of the system 100.

Furthermore, the filter 118 and the weighting component 120 can act upon the pilot carriers 104-108 and the data carriers 110-114 within the frequency domain. This enables calculations associated with observations relating to the data carriers 110-114 and pilot carriers 104-108 to be completed in an efficient and elegant manner. Furthermore, the filter 118 and weighting component 120 can be selectively activated and/or deactivated by a receiver according to performance and/or data packet type. For a specific example, the filter 118 and weighting component 120 can be associated with a receiver (not shown). The receiver can detect a data packet type that is being received, and activate the filter 118 and weighting component 120 accordingly.

Figure 2:
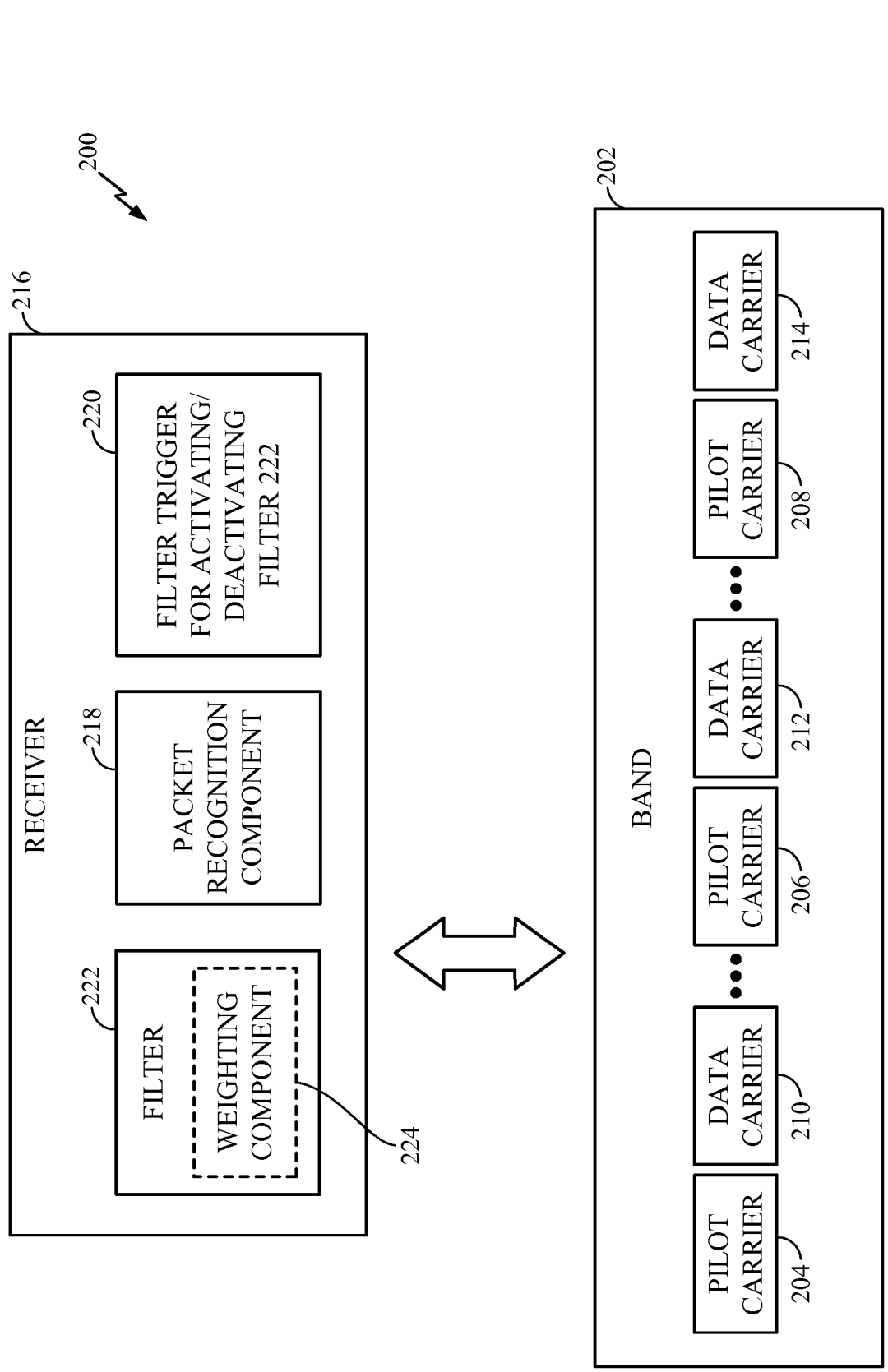
FIG. 2 is a block diagram of an exemplary embodiment of a system that employs a frequency domain filter at a receiver to reduce flooring associated with channel estimation.

Turning now to FIG. 2, an exemplary embodiment of a system 200 that facilitates reduction of a noise floor in connection with channel estimation in a wireless communication system (e.g., OFDM, OFDMA, CDMA, TDMA, GSM, . . . ) is illustrated. The system 200 includes a band 202 that is associated with a plurality of subcarriers utilized in connection with data transmittal. For example, a subset of such subcarriers are defined as pilot carriers 204-208, which are designed to carry symbols known to a receiver a priori. Furthermore, data carriers 210-214 can further be included within the band 202. In accordance with one aspect, a number of pilot carriers ($N_P$) can be a power of 2, and such pilot carriers 204-208 can be uniformly spaced amongst the data carriers 210-214 within the band 202. The pilot carriers 204-208 can be received by a receiver 216, which can be associated with a mobile unit such as a cellular phone, a PDA, a pager, a laptop computer, etc. The receiver 216 can also be associated with a satellite, a tower, or any other unit that can receive signals over a wireless channel.

The receiver 216 includes a packet recognition component 218 that monitors data packets and recognizes data packet types. For example, if the pilot carriers 204-208 and data carriers 210-214 include symbols that are related to a 64 QAM data packet, the packet recognition component 218 can determine that the symbols are so related. Further, the packet recognition component 218 can nearly instantaneously recognize a switch in data packet format being communicated over the band 202. For instance, the pilot carriers 204-208 and the data carriers 210-214 can include symbols relating to a 16 QAM data packet, and thereafter include symbols relating to a 64 QAM data packet. The packet recognition component 218 can recognize an alteration in data packet format and determine a type of data packet currently being received by the receiver 216. The packet recognition component 218 can relay knowledge of data packet type to a filter trigger 220, which is employed to selectively activate/deactivate a filter 222 within the receiver 216 according to a recognized data type. For instance, if the receiver 216 is receiving 16 QAM data packets, the packet recognition component 218 can recognize such data type and relay the information to the filter trigger 220. The filter trigger 220 can thereafter deactivate the filter 222, as such filter 222 may be needed only for high-level data packets (e.g., 64 QAM data packets). If the receiver 216 thereafter receives 64 QAM data packets, the packet recognition component 218 can sense a switch in data packet format and recognize that received data within the band 202 is 64 QAM data packet. Such information can be relayed to the filter trigger 220, which can thereafter activate the filter 222.

The filter 222 includes a weighting component 224 that selectively weights contributions of the pilot carriers 204-208 and the data carriers 210-214 based at least in part upon proximity of each pilot carrier and data carrier to an edge of the band 202. In particular, contributions of pilot carriers and data carriers proximate to an edge of the band 202 are weighted down more than pilot carriers and data carriers near the center of the band 202. Such weighting of contributions of the pilot carriers 204-208 and the data carriers 210-214 causes the channel estimation noise floor to be reduced with respect to a vast majority of the band 202. The weighting improves performance with respect to transmittal and reception of data packets that operate at high spectral efficiency, as a vast majority of subcarriers within the band 202 are subject to a reduced noise floor. As described above, the weighting reduces effects of channel continuity imposed upon the channel when performing a linear transformation (e.g., an IFFT-FFT routine) upon observations extracted from the pilot carriers 204-208. In accordance with yet another exemplary embodiment, filter coefficients can be selectively activated and/or deactivated while estimating subcarriers proximate to an edge of the band. For example, if the above-described filtering undesirably affects channel estimates at the band edge, filter coefficients can be deactivated while estimating subcarriers proximate to the band edge. Associating the filter 222 and the weighting component 224 with the receiver 216 enables utilization of the filter 222 to become flexible, wherein the filter 222 can be activated and deactivated according to packet format and/or performance.

Figure 3:
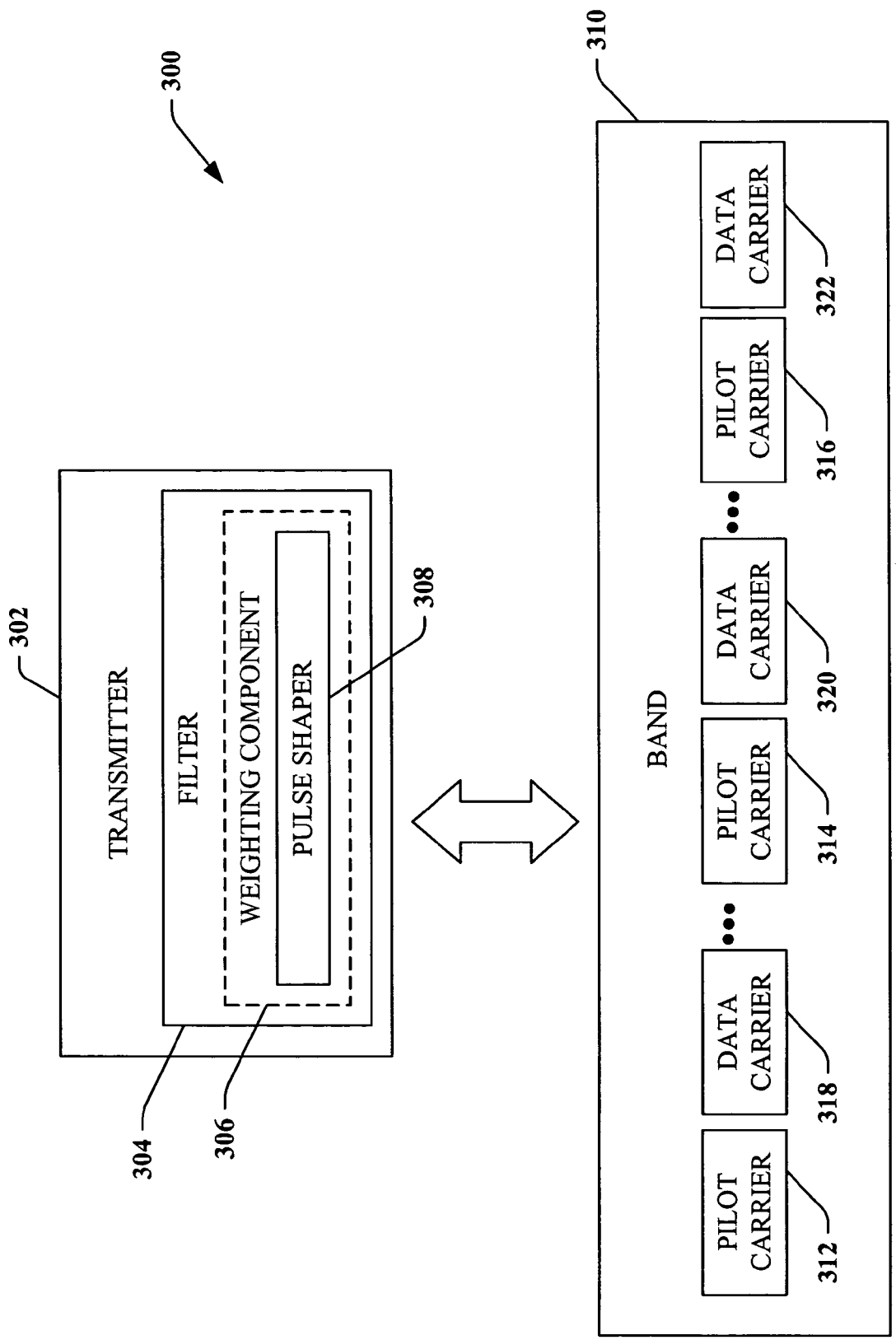
FIG. 3 is a block diagram of an exemplary embodiment of a system that employs a frequency domain filter at a transmitter to reduce flooring associated with channel estimation.

Now referring to FIG. 3, a system 300 that facilitates reduction of a noise floor during channel estimation in a wireless communication system is illustrated. The system 300 includes a transmitter 302 that is utilized to deliver signals to a receiver (not shown) over a wireless channel. For example, the transmitter 302 can be associated with a device (e.g., a cellular phone, a PDA, a laptop, a pager, a desktop computer, . . . ) that can transmit data over a wireless network. In a disparate embodiment, the transmitter 302 can be associated with a base station (e.g., a tower), a satellite, or other high-volume station that transmits data to a plurality of devices and/or stations. Thus, all suitable transmitters that can be employed within the system 300 are contemplated and intended to fall under the scope of the hereto-appended claims.

The transmitter includes a filter 304 that is utilized to shape a transmit spectrum. Such spectrum shaping is accomplished by employing a weighting component 306 that utilizes a pulse shaper 308 to shape the spectrum (band 310). In particular, the band 310 that is employed to deliver data over a plurality of subcarriers (not shown) is utilized by the transmitter 302, and includes pilot carriers 312-316 that carry symbols utilized for channel estimation purposes as well as data carriers 318-322 employed to transfer data. The filter 304 utilizes the weighting component 306 and the pulse shaper 308 to weight the pilot carriers 312-316 and the data carriers 318-322 within the band 310 prior to transmittal to a receiver. For example, the pulse shaper 308 can employ a raised cosine filter in connection with shaping the band 310 (or any other suitable transmit spectrum). Employing the filter 304 at the transmitter 302 can reduce signal to noise ratio at an edge of the band 310; however, such filtering allows for a sharper pulse function that thereby mitigates flooring in a channel estimation procedure. A linear transformation procedure (e.g. an IFFT) can be performed on observations obtained from the pilot carriers 312-316 at a receiver (not shown), which provides a channel estimate in the temporal domain. Thereafter, for example, an FFT procedure can be subsequently utilized to acquire a channel estimate in the frequency domain.

The system 300 thus enables utilization of the filter 304, weighting component 306, and the pulse shaper 308 at the transmitter 302. The filter 304 can be employed entirely within the frequency domain, thereby rendering operation of such filter 304 to be vastly more efficient than filters employed in the time domain. If utilized at a high-volume transmitter, however, the filter 304, weighting component 306, and pulse shaper 308 may desirably be activated during all transmittals. Such constant activation has not been found to negatively effect transmission of lower-level data packets.

Figure 4:
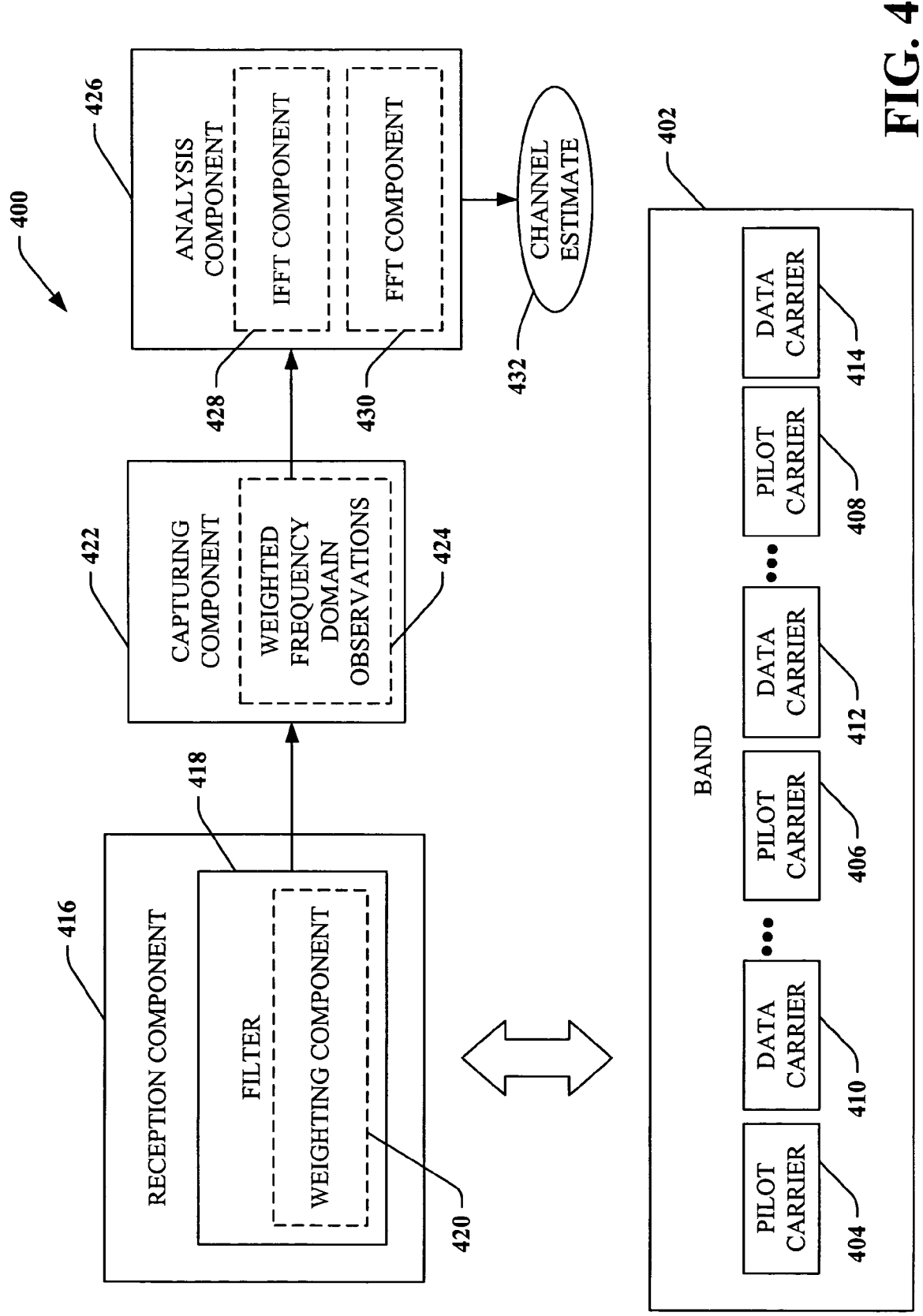
FIG. 4 is a block diagram of an exemplary embodiment of a system that facilitates obtaining a channel estimate with a reduced noise floor.

Now turning to FIG. 4, a system 400 that facilitates mitigation of a flooring effect in conventional channel estimation systems/methodologies is illustrated. The system 400 includes a band 402 that comprises a plurality of subcarriers. Amongst the subcarriers are a plurality of pilot carriers 404-408, which are employed to carry signals known to a receiver a priori that are utilized in connection with channel estimation, and data carriers 410-414, which are utilized to carry data (e.g., voice data, . . . ). In one exemplary embodiment, a number of the pilot carriers can be a power of two to enable a simple $N_P$ point IFFT and FFT to estimate the frequency domain channel, where $N_P$ is a number of pilot carriers. The band 402 is received by a reception component 416 that can be associated with a receiver and/or a transmitter. If the reception component 416 is associated with a transmitter, the reception component 416 receives the band 402 and subcarriers therein (including the pilot carriers 404-408 and the data carriers 410-414) prior to symbols within the band being transmitted. If the reception component 416 is associated with a receiver, the band 402 and subcarriers therein are received by the reception component 416 after transmittal.

The reception component 410 includes a filter 412 that weights contributions from the pilot carriers 404-408 and the data carriers 410-414 within the band 402 according to position thereof within such band. For example, the filter 418 can be associated with a weighting component 420 that selectively weights the pilot carriers 404-408 and the data carriers 410-414 within the band 402. In particular, if the reception component 416 is associated with a transmitter, the weighting component 420 can include a pulse shaper (e.g., a raised cosine filter) to effectively weight the pilot carriers 404-408 and the data carriers 410-414 within the band 402. If the reception component is associated with a receiver, the weighting component 420 can employ various multipliers, a raised cosine filter, or the like to weight the pilot carriers 404-408 and the data carriers 410-414 within the band 402.

Upon the filter 418 and weighting component 420 manipulating weights of contributions of the pilot carriers 404-408 and the data carriers 410-414, a capturing component 422 extracts the pilot carriers 404-408 from the band 402 and acquires scaled frequency observations 424 relating to each of the pilot carriers 404-408. Thus, for example, if the band 402 includes 32 pilot carriers, then the capturing component 422 would extract and capture 32 frequency domain observations relating to the pilot carriers 404-408. In particular, 32 pilot symbols carried on the pilot carriers 404-408 are captured as the scaled frequency domain observations 424. If desirable, the capturing component 422 can extract and capture a plurality of frequency domain observations relating to the pilot carriers 404-408 and average such observations over time. Furthermore, in one embodiment relating to the system 400, if one or more of the pilot carriers 404-408 are resident within a guardband of the band 402, then observations relating thereto can be assumed to be zero. Various pilot carrier extrapolation algorithms and techniques can be employed in connection with generating the aforementioned assumption.

The frequency domain observations 424 within the capturing component 422 can thereafter be delivered to an analysis component 426. The analysis component 426 includes an IFFT component 428 that performs an IFFT routine upon the frequency domain observations 424, resulting in a vector of observations in time (e.g., estimated chips in time). Accordingly, it is important not to simply discard observations relating to pilot carriers within the guardband, as it would change a number of observations subject to the IFFT. To maintain simplicity, the number of observations obtained from the pilot carriers 404-408 is desirably a power of 2. After obtaining the observations in the time domain, such observations are subject to a FFT component 430 that performs an FFT routine on such observations, thereby updating a channel that utilizes the band 402 in the frequency domain. The IFFT-FFT routine performed by the IFFT component 428 and the FFT component 430 on the weighted frequency domain observations 424 produces a channel estimate 432 with a reduced noise floor. Therefore, communications involving high-level data packets (such as 64 QAM data packets) can be improved.

As described previously, the filter 418 and the weighting component 420 weight contributions of the pilot carriers 404-408 and data carriers 410-414 (e.g. observations obtained therefrom) according to position within the band 402. Such weighting improves channel estimation due to properties of linear transformations (e.g., IFFTs and FFTs), as the weighting artificially enforces continuity across edges of the band 402, even though an actual channel is often not continuous across such edges. Thus, by weighting observations within the frequency domain to provide continuity across edges of the band 402 prior to performing linear transformation, performance relating to the channel is improved, as a vast majority of data is delivered over a center portion of the band 402.

Referring to FIGS. 5-8, methodologies relating to lowering a noise floor relating to channel estimation are illustrated. While, for purposes of simplicity of explanation, the methodologies are shown and described as a series of acts, it is to be understood and appreciated that the methodologies are not limited by the order of acts, as some acts may, in accordance with these methodologies, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement the following methodologies.

Figure 5:
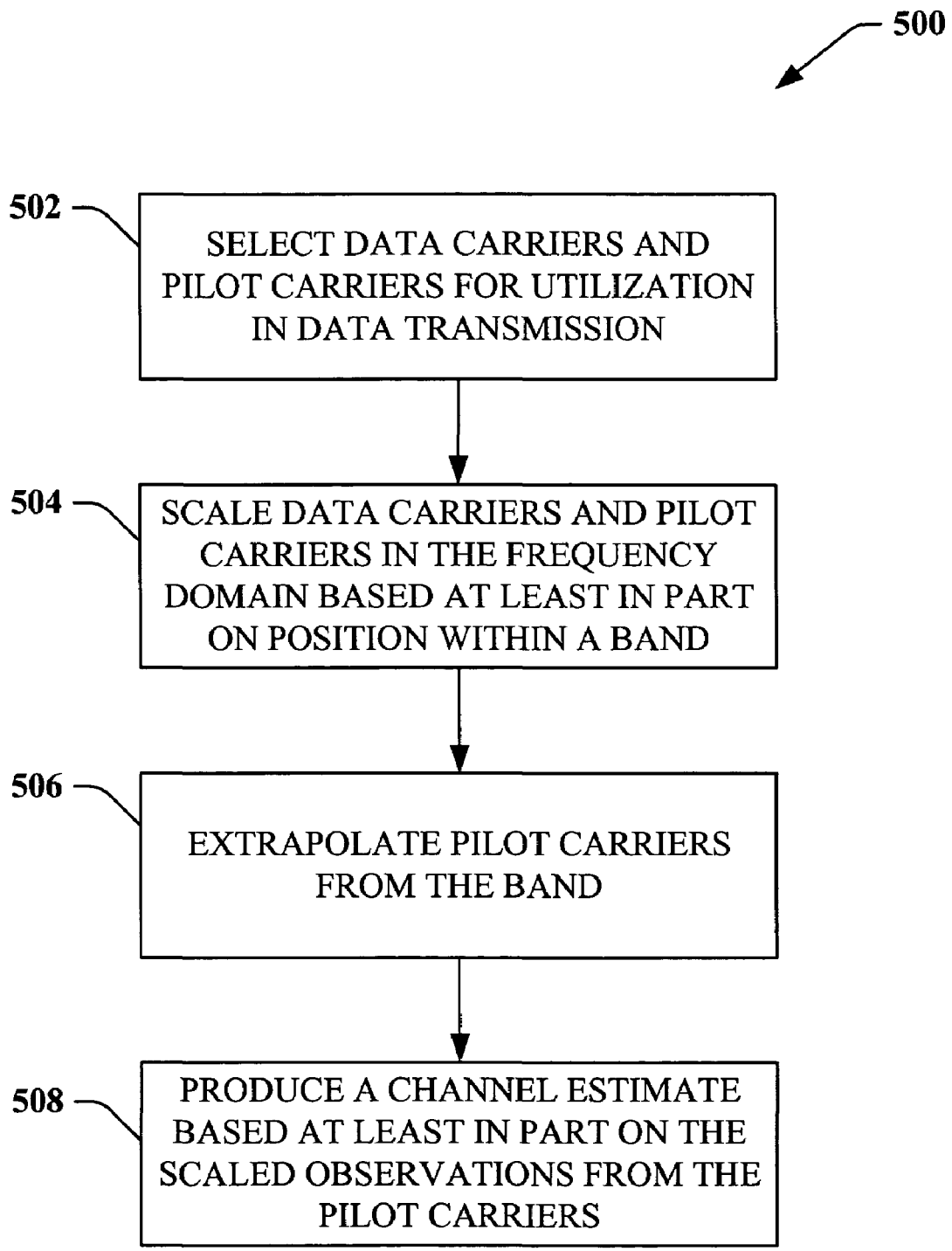
FIG. 5 is a flow diagram illustrating a methodology for obtaining a channel estimate with reduced estimation error.

Referring now solely to FIG. 5, a methodology 500 for improving channel communications with respect to high-level data packets is illustrated. At 502, data carriers and pilot carriers are selected for utilization in data transmission. More specifically, a transmission band in, for example, an OFDM communication system includes a plurality of orthogonal subcarriers, wherein such subcarriers are modulated by data relating to each of such subcarriers. Pilot symbols (e.g., symbols known to a receiver prior to being received) can be delivered over a plurality of the subcarriers, and observations relating to the received pilot symbols can be employed to estimate a channel. Subcarriers that carry the pilot symbols can be referred to as pilot carriers, and such pilot carriers are desirably uniformly spaced amongst all subcarriers (e.g., data carriers) within a band.

At 504, the data carriers and pilot carriers are scaled in the frequency domain based at least in part upon position within the band of such carriers (pilot carriers and data carriers). More particularly, observations relating to pilot symbols on the pilot subcarriers as well as symbols upon the data carriers are received and scaled in the frequency domain rather than the time domain. If the scaling is completed at a receiver, the scaling can be accomplished by way of simple multipliers, a raised cosine filter, or the like. For example, an observation obtained from a pilot carrier or data carrier near a band edge will be scaled down more when compared to an observation obtained from a pilot carrier or data carrier near a center of the band.

At 506, pilot carriers are extrapolated from the band, and scaled observations are obtained from the scaled pilot carriers. Any suitable extrapolation algorithm can be utilized in connection with extracting observations from the pilot carriers. It is understood, however, that both pilot carriers and data carriers are scaled; therefore, measurements/observations obtained therefrom will likewise be scaled according to position with the frequency band of the carrier from which they were obtained.

At 508, a channel estimate is produced as a function of the scaled observations from the pilot carriers. For example, a linear transformation (e.g., an IFFT-FFT routine) can be performed upon the scaled observations, thus updating a channel in frequency. By utilizing scaled observations obtained from pilot carriers according to position of the pilot carriers within the band, a resultant channel estimate will be less dependent upon observations obtained from pilot carriers proximate to a band edge and more dependent upon observations obtained from pilot carriers that lie near a center of the band. Thus, a noise level with respect to a vast majority of subcarriers in a band is reduced during channel estimation, which improves performance of a channel when high-level packets are desirably communicated.

Figure 6:
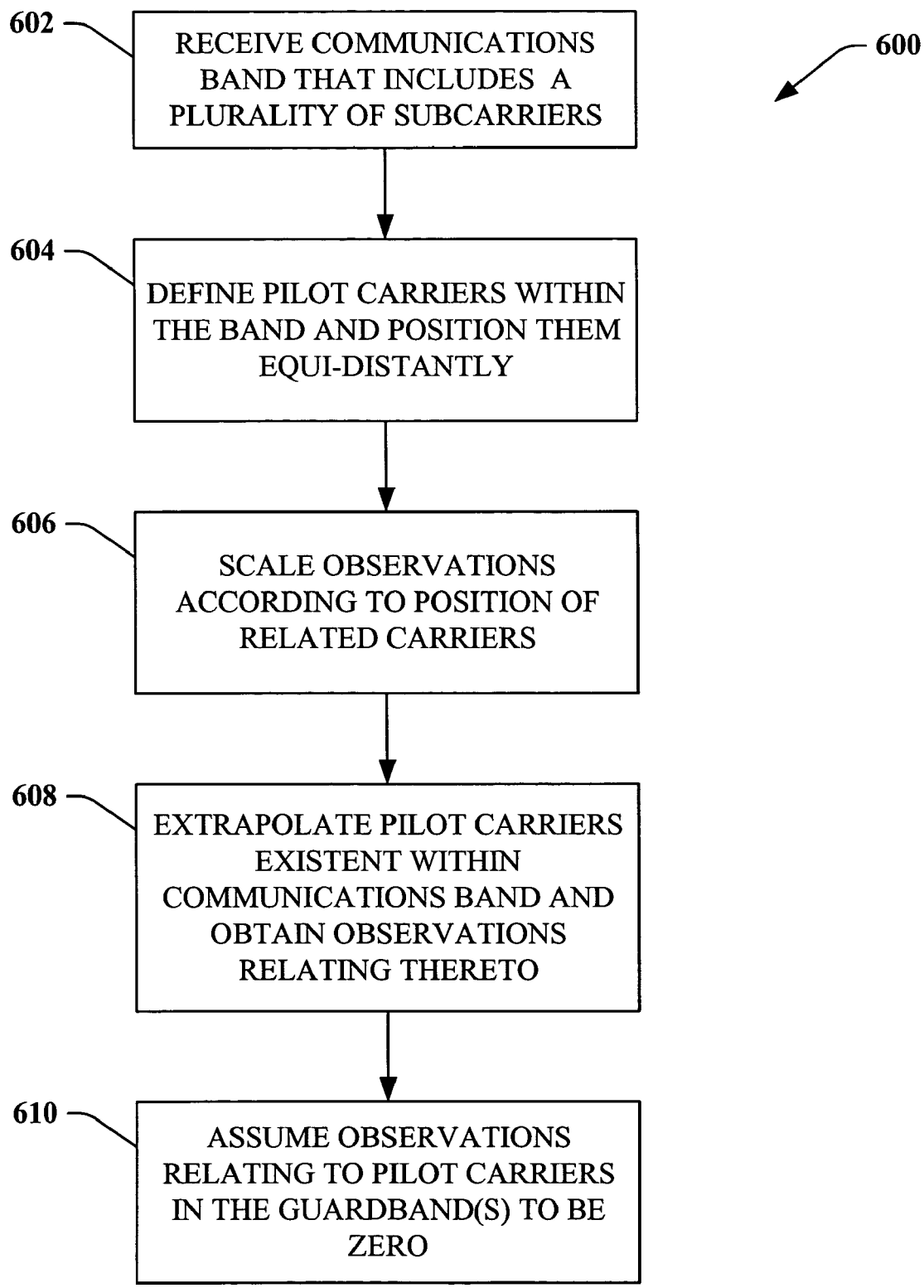
FIG. 6 is a flow diagram illustrating a methodology for selectively scaling data carriers and pilot carriers.

Now turning to FIG. 6, a methodology 600 for generating a channel estimate with a reduced noise floor in comparison to conventional channel estimation systems/methods is illustrated. At 602, a communications band that includes a plurality of subcarriers is received. In one exemplary embodiment, the communication band exists within an OFDM communications system, wherein the plurality of subcarriers are orthogonal subcarriers modulated by data relating thereto. At

604, pilot carriers within the band are defined, wherein such pilot carriers are positioned equi-distantly within the band.

At 606, pilot carriers and data carriers within the communications band are selectively scaled according to position of such carriers within the band. For example, if the scaling is performed at a transmitter, a pulse shaping function can be utilized to scale a transmit spectrum (and consequently scale the received observations). For example, a raised cosine filter can be employed to scale the observations, as transmission power associated with the carriers is affected. If the scaling is performed at the receiver, the observations can be subject to simple multipliers, wherein the multipliers are selected based upon position of a pilot carrier from which an observation was extracted. Again, a raised cosine filter can be multiplied against the pilot carriers and the data carriers, thereby scaling such carriers (and observations obtained therefrom). Thus, if a first observation was obtained from a carrier proximate to a band edge and a second observation was obtained from a carrier proximate to a center of the band, the second observation would be subjected to a greater multiplier than the first observation. This has an effect of artificially enforcing continuity across edges of a frequency band.

At 608, pilot carriers within the communications band can be extrapolated, and observations relating to the extrapolated pilot carriers can be obtained. At 610, an assumption is made that observation(s) relating to the pilot carrier(s) within guardband(s) of the communications band are zero. In OFDM systems, a guardband is defined at edges of bands, wherein no communications exist within such guardbands. As pilot carriers are equi-distantly positioned within the band, pilot carriers can fall within the guardbands (and thus, no transmission can be made over the pilot carriers). Accordingly, pilot symbols cannot be obtained from pilot carriers that are resident within the guardbands. While zero is one assumption that can be utilized, it is understood that any suitable value that provides an adequate channel estimate can be employed as the assumed value. Thereafter, a channel estimate with a reduced noise floor can be generated by way of performing a linear transformation upon the scaled observations obtained from the scaled pilot carriers.

Figure 7:
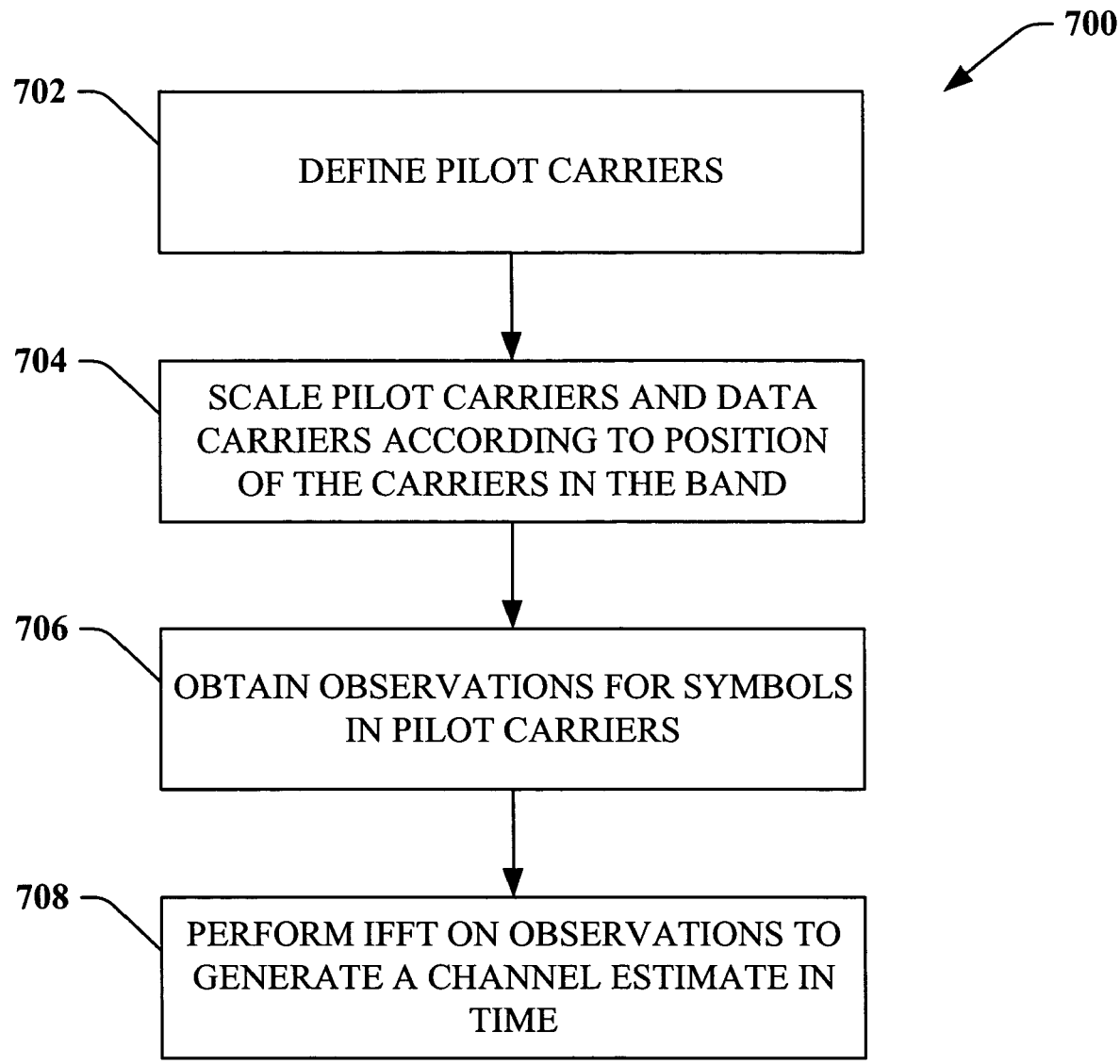
FIG. 7 is a flow diagram illustrating a methodology for obtaining observations related to a channel in the time domain.

Referring now to FIG. 7, a methodology 700 for generating a channel estimate in the time domain is illustrated. At 702, pilot carriers are defined amongst a plurality of subcarriers in a band. For example, the pilot carriers can be uniformly spaced and be employed to carry pilot signals. At 704, pilot carriers and data carriers within a communications band are scaled as a function of position of such carriers within the band. For instance, simple multipliers can be employed to effectuate such selective scaling. More particularly, if employed at a receiver, a raised cosine filter can be multiplied against a frequency band to desirably scale carriers within such band. A substantially similar filtering mechanism can be also and/or alternatively employed at a transmitter if desired. At 706, the pilot observations over multiple symbols can be averaged to facilitate noise suppression and improve channel estimation. At 708, an $N_P$ point IFFT operation is performed upon the matrix/vector of acquired observations, where $N_P$ is a number or pilot carriers within the band. Such an IFFT operation transforms the observations from observations in the frequency domain to observations in the time domain. Thus, a channel estimate is generated in the time domain based upon the observations obtained from the pilot carriers. The methodology 700 utilizes scaling that can be accomplished exclusively in the frequency domain.

Figure 8:
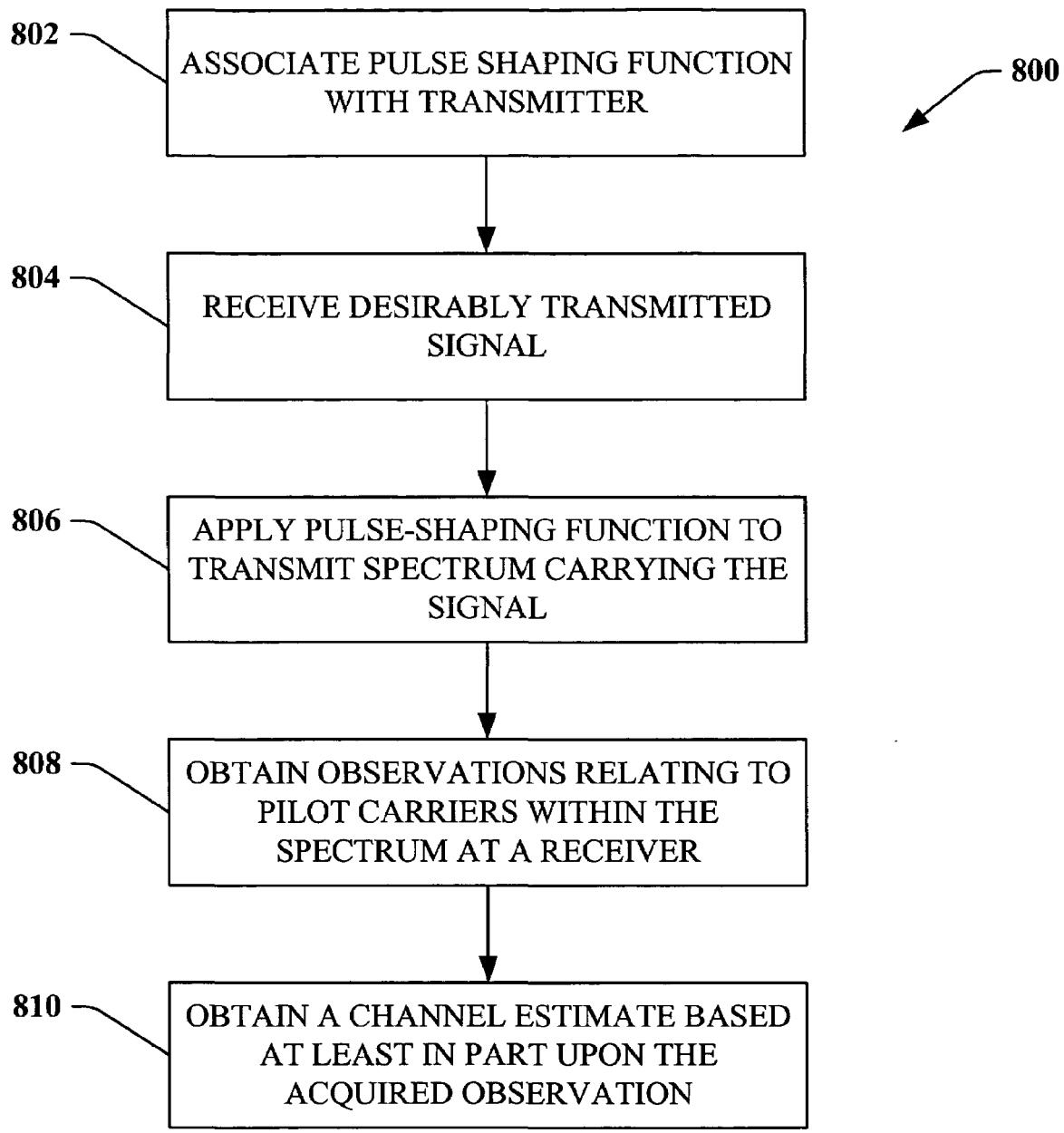
FIG. 8 is a flow diagram illustrating a methodology for scaling data carriers and pilot carriers at a transmitter.

Now turning to FIG. 8, a methodology for applying a frequency domain filter at a transmitter and utilizing such filter to mitigate a flooring effect associated with channel estimation is illustrated. At 802, a pulse shaping function implemented in the frequency domain is associated with a transmitter. For example, the pulse shaping function can be a raised cosine filter, wherein subcarriers (e.g., data carriers and pilot carriers) at edges of a band are delivered with less power than subcarriers at a center of a band. It is to be understood, however, that any suitable pulse shaping function/algorithm/device can be employed in connection with the described embodiments, and all such functions/algorithms/device are intended to fall under the scope of the hereto-appended claims. At 804, a desirably transmitted signal is received at the transmitter, and at 806 the pulse-shaping function is applied (at the transmitter) to a spectrum carrying the desirably transmitted signal. This effectively scales the spectrum in the frequency domain by way of weighting carriers proximate to band edges less than carriers proximate to a center of the band.

At 808, the transmitted signal is received by a receiver, and observations relating to pilot carriers (e.g., pilot symbols) are acquired by way of extrapolating the pilot carriers from the band. At 810, a channel estimate is obtained based at least in part upon the acquired observations from the pilot carriers. In particular, the observations can be placed in a vector or matrix form, and then be subject to an IFFT operation. This creates a vector or matrix of observations in the time domain. An FFT operation can thereafter be utilized to update the channel in frequency. Other suitable linear transformation method(s) and/or mechanism(s), however, are contemplated and intended to fall under the scope of the hereto-appended claims.

Figure 9:
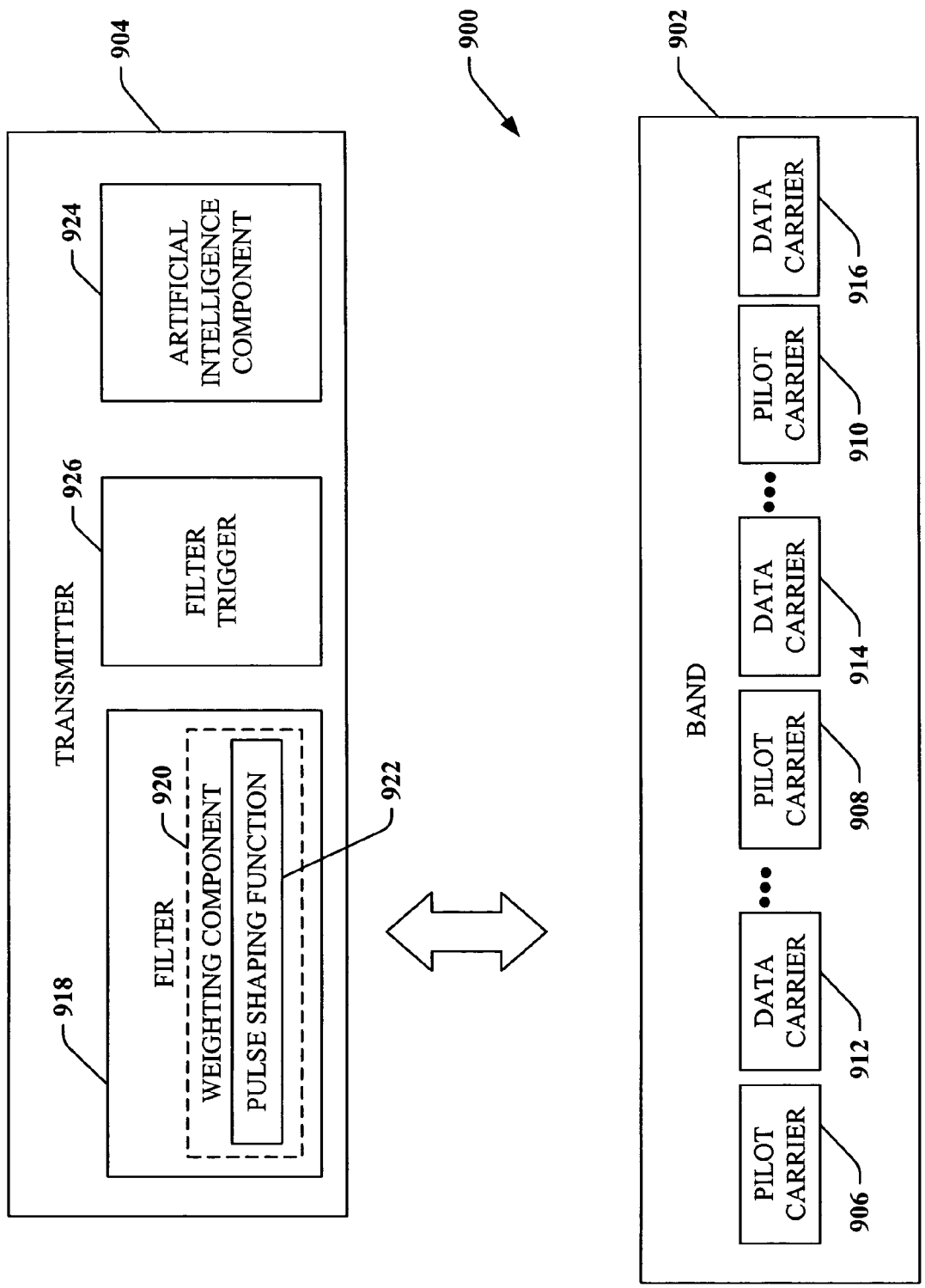
FIG. 9 is a block diagram of an exemplary embodiment of a system that employs artificial intelligence to facilitate optimal communication in a wireless communication system.

Now referring to FIG. 9, a system 900 that facilitates reducing a noise floor in connection with channel estimation is illustrated. The system 900 includes a band of subcarriers 902, wherein the band 902 (and subcarriers) include signals desirably transmitted by a transmitter 904. The band 902 includes a plurality of pilot carriers 906-910 that are uniformly spaced amongst data carriers 912-916 within the band 902. The pilot carriers 906-910 are employed to carry pilot signals to a receiver (not shown), which can thereafter generate a channel estimate based at least in part upon observations relating to such pilot signals. The transmitter 904 includes a filter 918 that utilizes a weighting component 920 (specifically, a pulse shaping function 922) to shape a channel that is associated with the band 902. In particular, subcarriers (e.g., the pilot carriers 906-910 and the data carriers 912-916) proximate to edges of the band 902 are weighted down more than subcarriers proximate to a center of the band 902.

The system 900 further includes an artificial intelligence component 924 that can watch traffic on a network and make inferences regarding applicability and desirability of utilizing the filter 918. As used herein, the terms to "infer" or "inference" refer generally to the process of reasoning about or inferring states of a system, environment, and/or user from a set of observations as captured by way of events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. For instance, the artificial intelligence component 924 can watch the network and learn over time that overall performance of the network is improved with the filter activated at certain times and/or on certain days, and overall performance of the network is improved with the filter deactivated at certain times and/or on certain days. In a more particular example, between business hours during a weekday a wireless network can perform optimally with the filter deactivated, as fewer high-level data packets are desired for transmittal/receipt during such time. However, during certain evening hours, desirability of high-level data packet transmittal may rapidly rise. Thus, the artificial intelligence component 924 can make inferences based upon previous usage, performance, available bandwidth, operation, and various contextual data to activate/deactivate the filter 918. A filter trigger 926 can be utilized in connection with activating and/or deactivating the filter 918.

Figure 10:
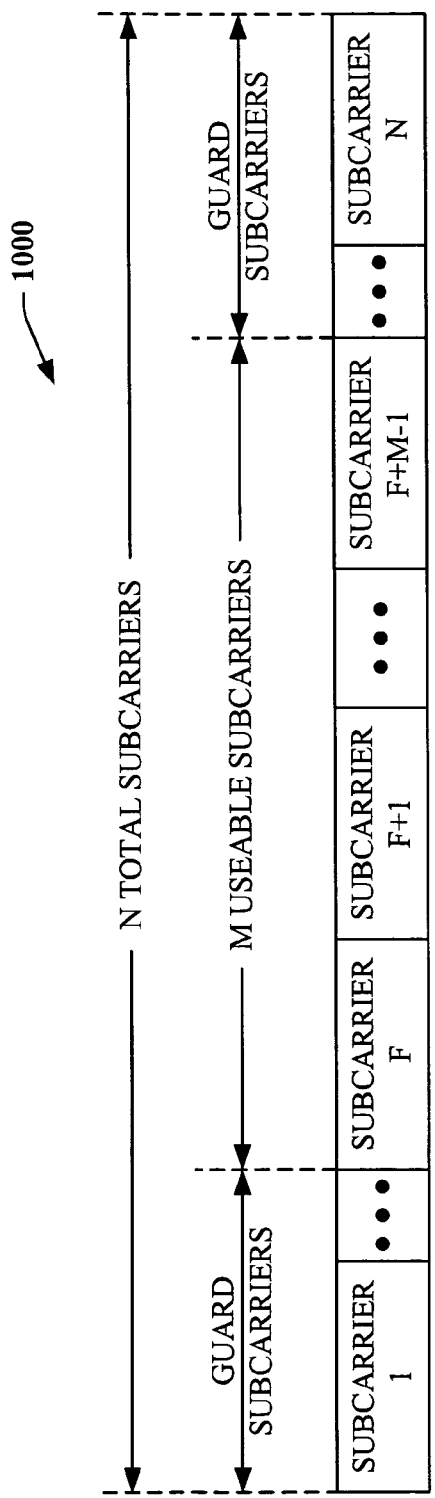
FIG. 10 is an exemplary subcarrier structure that can be employed in a wireless communication system.

Now referring to FIG. 10, an exemplary subcarrier structure 1000 that can be utilized in connection with a wireless communication system is illustrated. Wireless communication systems (e.g., OFDM, OFDMA, CDMA, TDMA, GSM, . . . ) are associated with a particular amount of bandwidth (BW MHz) that is partitioned into N orthogonal subcarriers. Accordingly, each of the N subcarriers has a bandwidth of BW/N MHz. In spectrally shaped OFDM systems, for example, only a subset of the N total subcarriers is utilized for data and/or pilot symbol transmission. In particular, M of the total N subcarriers can be utilized for data/pilot symbol transmission, where M<N. The remaining M-N subcarriers are not utilized for data/pilot symbol transmission and serve as guardbands to allow OFDM systems to meet spectral mask requirements. The M subcarriers employed for data/pilot symbol transmission include subcarriers F through F+M−1 and are typically centered among the N total subcarriers.

The N subcarriers shown in the exemplary subcarrier structure 1000 can be subject to disparate channel conditions, such as differing fading and multipath effects. Further, the N subcarriers can be associated with disparate complex channel gains. Therefore, an accurate estimate of the channel response is typically needed to process data at a receiver, where processing includes at least demodulation and decoding of the data. For example, a wireless channel in an OFDM system can be characterized by a time-domain response or a corresponding frequency domain response of such channel. As described above and known in the art, these time and frequency domain responses can be obtained by way of obtaining observations of pilot symbols in the frequency domain and thereafter employing an IFFT-FFT routine.

Figure 11:
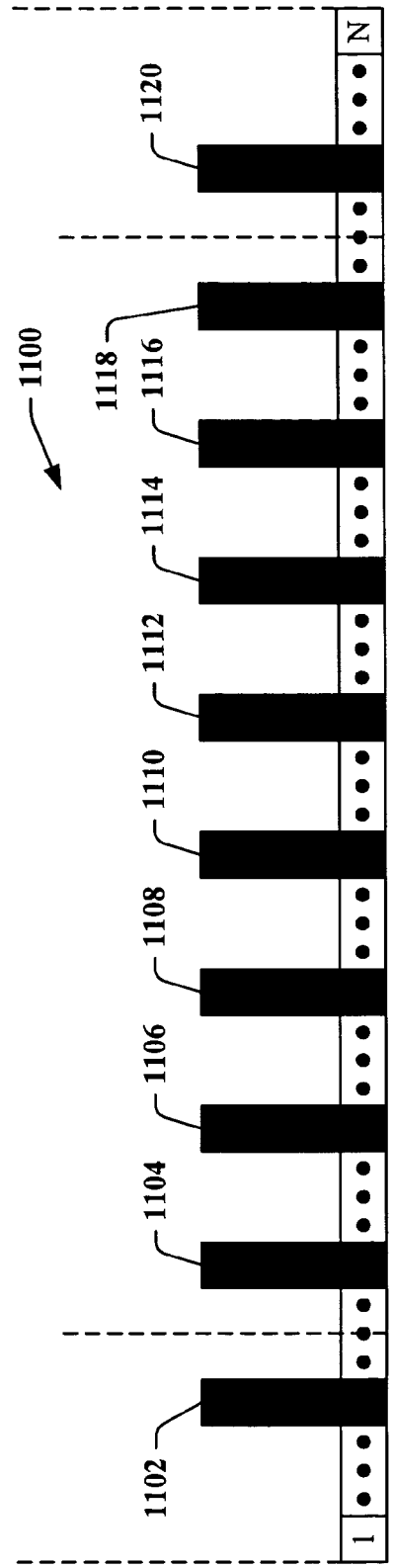
FIG. 11 illustrates a plurality of pilot carriers that can carry pilot symbols in a wireless communications system.

Turning briefly to FIG. 11, a pilot transmission structure 1100 that can be utilized in wireless communication systems (e.g., OFDM, OFDMA, . . . ) is illustrated. This structure 1100 facilitates obtainment of a frequency response estimate for a wireless channel in an OFDM system, for example. Pilot symbols can be transmitted on each of the illustrated subcarriers 1102-1120, where a number of such pilot subcarriers is P. The pilot subcarriers are distributed across the N total subcarriers (FIG. 10), and in one exemplary embodiment are distributed uniformly amongst the N total subcarriers. Thus, for instance, a number of subcarriers between pilot carriers 1104 and 1106 can be same as a number of subcarriers between pilot carriers 1112 and 1114, 1114 and 1116, and so on. Such uniformity enables a linear transformation routine (e.g., an IFFT-FFT routine) to be undertaken with respect to pilot symbols on the pilot carriers 1102-1120. It is possible that one or more subcarriers can reside within guardbands, where no transmissions are enabled. In particular, subcarriers 1102 and 1120 are shown to reside within guardbands—therefore, obtaining pilot symbols from these pilot carriers 1102 and 1120 is not possible. Rather than dismissing such pilot carriers, one embodiment relates to generating assumptions regarding values of symbols on such pilot carriers 1102-1120. For instance, pilot symbols can be assumed to be zero upon the subcarriers 1102-1120. These assumptions maintain structure necessary to utilize an IFFT-FFT routine in connection with obtaining a channel estimate.

The pilot carriers 1102-1120 (and/or pilot symbols therein) as well as other carriers within the structure 1100 can be subject to a filtering mechanism that effectively weights the pilot carriers and data carriers as a function of location of such carriers within the structure 1100. Thereafter, the pilot carriers 1104-1118 can be extracted from the structure 1100, and scaled observations relating thereto can be obtained. For example, contributions obtained from pilot carrier 1104 (which is proximate to an edge of the structure 1100) will be given less weight than contributions from pilot carrier 1112 (which is proximate to a center of the structure 1100). A pulse shaping function can be utilized at a transmitter to weight pilot carriers and the data carriers, and a simple multiplying algorithm/table can be utilized at a receiver to effectively weight pilot carriers and data carriers within the structure 1100. An estimate of the frequency response can thereafter be obtained, wherein such estimate is associated with a lower noise floor when compared to conventional estimation techniques.

Figure 12:
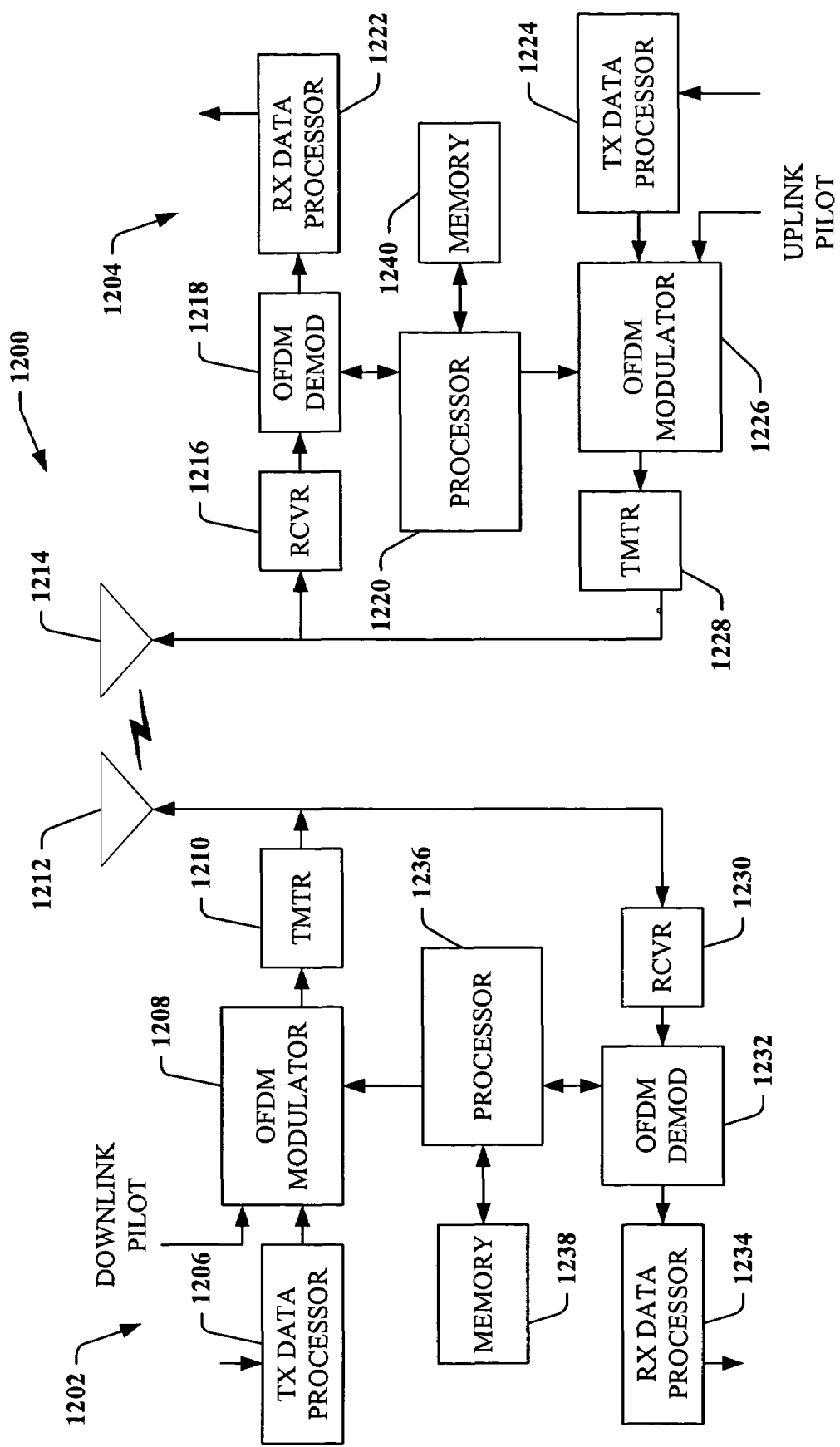
FIG. 12 is an exemplary system that is employable within a wireless communications environment.

Referring now to FIG. 12, a block diagram 1200 that includes an access point 1202 and a terminal 1204 in, for example, a spectrally shaped OFDM system is illustrated. On a downlink, at access point 1202 a transmit (TX) processor 1206 receives, formats, codes, interleaves, and modulates (e.g., symbol maps) traffic data and provides modulation symbols (e.g., data symbols). An OFDM modulator 1208 receives and processes the data symbols and pilot symbols and provides a stream of OFDM symbols. OFDM modulator 1208 multiplexes data and pilot symbols on proper subcarriers, can provide a signal value of zero for unused subcarriers, and can obtain a set of N transmit symbols for N subcarriers for each OFDM symbol period. The transmit symbols can be data symbols, pilot symbols, signal values of zero, and any other suitable data symbol. For example, pilot symbols can be delivered over active pilot subcarriers, and pilot symbols can be delivered continuously in each OFDM symbol period. In a disparate embodiment, pilot symbols can be time division multiplexed (TDM) with the data symbols on a substantially similar subcarrier. The OFDM modulator 1208 can repeat a portion of each transformed symbol to obtain a corresponding OFDM symbol. This repeating is known as a cyclic prefix and can be employed to combat delay spread in a wireless channel.

A transmitter unit 1210 can receive and convert a stream of OFDM symbols into one or more analog symbols to generate a downlink signal suitable for transmission over a wireless channel. In one exemplary embodiment, the transmitter unit 1210 can be associated with a pulse-shaping filter, such as a raised cosine filter, to effectively shape a signal. This downlink signal can then be transmitted by way of an antenna 1212 to a plurality of terminals, including the terminal 1204. An antenna 1214 associated with the terminal 1204 receives the downlink signal and provides a received signal to a receiver unit (RCVR) 1216, which conditions (e.g., filters, amplifies, and frequency downconverts) the received signal and digitizes the conditioned signal to acquire samples. For example, the receiver unit 1216 can include a filter that selectively scales pilot carriers and data carriers as a function of location of such carriers within a communications band. An OFDM demodulator 1218 can employ an IFFT operation to obtain OFDM symbols in a time domain, remove the cyclic prefix appended to the OFDM symbols, transform the received transformed symbols to the frequency domain using an N-point FFT, obtain N received symbols for the N subcarriers for each OFDM symbol period, and provide received, scaled pilot symbols to a processor 1220 for channel estimation. The OFDM demodulator 1218 can further receive frequency response estimate(s) for the downlink from the processor 1220, perform data demodulation on the received data symbols to acquire data symbol estimates (e.g., estimates of transmitted data symbols), and provide data symbol estimates to an RX data processor 1222. The RX data processor 1222 demodulates (e.g., symbol demaps), deinterleaves, and decodes data symbol estimates to recover transmitted traffic data. Processing undertaken by the OFDM demodulator 1218 and the RX data processor 1222 is complimentary to processing undertaken by the OFDM modulator 1208 and TX data processor 1206, respectively, at access point 1202.

The processor 1220 obtains the received pilot symbols from active pilot subcarriers and performs channel estimation as described supra. The processor 1220 can be utilized in connection with extrapolating and/or interpolating as desired to obtain channel gain estimates for $P_{dn}$ uniformly spaced subcarriers, were $P_{dn}$ is a number of pilot subcarriers for a downlink, deriving a least square impulse response estimate for the downlink, performing tap selection for disparate taps of the impulse response estimate, and deriving a final frequency response estimate for N subcarriers for the downlink. On the uplink, a TX data processor 1224 can process traffic data and provide data symbols. An OFDM modulator 1226 can receive and multiplex data symbols with pilot symbols, perform OFDM modulation, and provide a stream of OFDM symbols. The pilot symbols can be transmitted on $P_{up}$ subcarriers that have been assigned to the terminal 1204 for pilot transmission, where a number of pilot subcarriers ($P_{up}$) for the uplink can be substantially similar to or substantially disparate from a number of pilot subcarriers ($P_{dn}$) for the downlink. A transmitter unit 1228 can thereafter receive and process a stream of OFDM symbols to generate an uplink signal, which can be transmitted by way of the antenna 1214 to the access point 1202.

The uplink signal from the terminal 1204 can be received by the antenna 1212 and processed by a receiver unit 1230 to obtain samples. An OFDM demodulator 1232 can process the samples and provide received pilot symbols and data symbol estimates for the uplink. An RX data processor 1234 can process the data symbol estimates to recover traffic data transmitted by the terminal 1204. A processor 1236 can perform channel estimation for each active terminal transmitting on the uplink. Multiple terminals can transmit pilot symbols concurrently on the uplink on respective assigned sets of pilot subcarriers, where the pilot subcarriers sets can be interlaces. For each terminal, the processor 1236 can perform extrapolation and/or interpolation as needed for the terminal, obtain an initial frequency response estimate for the uplink for the terminal 1204, derive a least square channel impulse response estimate for the terminal, perform tap selection, and obtain a final frequency response for the terminal 1204. A frequency response estimate for each terminal can be provided to the OFDM demodulator 1232 and utilized for data demodulation for that terminal. The processors 1236 and 1220 can direct operation at the access point 1202 and the terminal 1204, respectively. Memory units 1238 and 1240 can be employed to store programs and/or code and data utilized by the processors 1236 and 1220. The processors 1236 and 1220 can also be utilized to perform various computations to derive frequency and impulse response estimates for the uplink and downlink, respectively. As described above, filters can be utilized and associated with the access point 1202 and the terminal 1204 to selectively scale pilot symbols according to a position within a band of pilot subcarriers carrying such symbols. Such filtering can reduce a flooring effect when channel estimation is completed.

For multiple-access OFDM systems (e.g., an orthogonal frequency division multiples access (OFDMA) systems), multiple terminals can transmit concurrently on the uplink. For OFDMA and similar systems, pilot subcarriers can be shared amongst disparate terminals. Filters facilitating reduction of a flooring effect can be employed in instances where pilot subcarriers for each terminal span an entire operating band (possibly except for guardbands). This pilot subcarrier structure can be desirable to obtain frequency diversity for differing terminals. The channel estimation techniques described herein can be implemented through various means/devices. For example, hardware, software, or a combination thereof can be employed to obtain a channel estimate in accordance with one or more aforementioned embodiments. For example, the processing units employed for channel estimation purposes can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or any other suitable device/unit or a combination thereof. With respect to software, a channel estimation in accordance with one or more previously described embodiments can be obtained at least in part through use of modules (e.g., procedures, functions, . . . ) that perform one or more functions described herein. Software can be stored in memory, such as the memory units 1238 and 1240 and executed by one or more processors, such as the processors 1236 and 1220. Memory units can be implemented within processor(s) or can exist external thereto, and communication lines/techniques facilitating either configuration are contemplated and intended to fall under the scope of the hereto-appended claims.

What has been described above includes examples of one or more embodiments. It is, of course, not possible to describe every conceivable combination of components or methodologies for purposes of describing these embodiments, but one of ordinary skill in the art may recognize that many further combinations and permutations of such embodiments are possible. Accordingly, the embodiments described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for reducing channel estimation error in a wireless communications environment, comprising:

selectively scaling a data carrier and a pilot carrier of a communication device within a frequency band, the data carrier and pilot carrier scaled as a function of a location, determined based on a data type, within the band of the data carrier and pilot carrier so that the data carrier and the pilot carrier have less power when they are proximate to an edge of the band than when they are proximate to a center of the band;

obtaining an observation relating to the scaled pilot carrier; and estimating a channel as a function of the obtained observation.

2. The method of claim 1, further comprising performing a linear transformation upon the obtained observation.

3. The method of claim 1, further comprising performing an IFFT operation on the obtained observation.

4. The method of claim 3, further comprising performing an FFT operation upon results of the IFFT operation.

5. The method of claim 1, wherein the step of selectively scaling further comprises multiplying the pilot carrier and the data carrier by values that are selected as a function of locations of the pilot carrier and data carrier.

6. The method of claim 1, wherein the step of selectively scaling further comprises
providing a greater weight to one or more of a pilot carrier and a data carrier proximate to a center of the band than a weight provided to one or more of a pilot carrier and data carrier proximate to an edge of the band.

7. The method of claim 6, further comprising assuming that an observation relating to a pilot carrier within a guardband is zero.

8. The method of claim 1, further comprising activating the step of selectively scaling the data carrier and the pilot carrier upon detection of a first packet type.

9. The method of claim 8, wherein the first packet type is a 64 QAM data packet.

10. The method of claim 8, further comprising deactivating the step of selectively scaling the data carrier and the pilot carrier upon detection of a second packet type.

11. The method of claim 10, wherein the second packet type is a 16 QAM data packet.

12. The method of claim 1, wherein the step of selectively scaling further comprises positioning the plurality of pilot carriers equidistantly throughout the frequency band.

13. The method of claim 1, wherein the step of selectively scaling further comprises:
defining a number of the plurality of pilot carriers to be a power of 2.

14. The method of claim 1, wherein the step of selectively scaling further comprises scaling the data carrier and the pilot carrier in the frequency domain at a receiver.

15. The method of claim 14, wherein the receiver is part of a mobile unit.

16. The method of claim 1, wherein the step of selectively scaling further comprises scaling the data carrier and the pilot carrier in the frequency domain at a transmitter.

17. The method of claim 16, further comprising employing a raised-cosine filter to selectively scale the data carrier and the pilot carrier in the frequency domain at the transmitter.

18. The method of claim 1, wherein the step of selectively scaling further comprises:
performing an $N_p$ point Inverse Fast Fourier Transform on observations obtained from the plurality of pilot carriers, where $N_p$ is a number of the plurality of pilot carriers.

19. The method of claim 1, wherein the step of selectively scaling further comprises:
estimating the plurality of pilot carriers in time.

20. The method of claim 1, further comprising:
determining that the pilot carrier resides within a guardband; and
assigning a value to the observation relating to the pilot carrier.

21. The method of claim 20, wherein the step of assigning a value further comprises assigning a value of zero.

22. The method of claim 1, wherein the wireless communications environment is an OFDM, OFDMA, CDMA, TDMA, or GSM environment.

23. The method of claim 1. further comprising:
extrapolating the observation from the scaled pilot carrier when the scaled pilot carrier resides within a guard band; and
assigning a value to the extrapolated observation.

24. A channel estimation system, comprising:
a filtering component;
an extrapolating component;
at least one memory; and
at least one processor configured to execute instructions stored in the at least one memory, the executed instructions for controlling the filtering component such that the filtering component selectively scales a plurality of carriers as a function of location, based on a data type, of the plurality of carriers within a frequency band, the plurality of carriers comprising at least one data carrier and at least one pilot carrier,
wherein the extrapolating component extrapolates an observation from the at least one pilot carrier and estimates a channel as a function of the extrapolated observation, and
wherein the plurality of carriers are scaled so that carriers proximate to an edge of the band have less power than carriers proximate to a center of the band.

25. The system of claim 24, wherein the filtering component is configured to facilitate reducing a flooring effect associated with channel estimation.

26. The system of claim 24, wherein the at least one pilot carrier comprises a plurality of pilot carriers, and the pilot carriers ($N_p$) are scaled to a power of two.

27. The system of claim 26, further comprising a component that is configured to perform an $N_p$ point Inverse Fast Fourier Transform upon $N_p$ observations obtained from the Np pilot carriers to facilitate obtaining a full frequency domain channel.

28. The system of claim 27, further comprising a component that is configured to perform an $N_p$ point Fast Fourier Transform to facilitate obtaining a full frequency domain channel.

29. The system of claim 26, wherein the plurality of pilot carriers is staggered in time.

30. The system of claim 26, wherein the plurality of pilot carriers are equi-spaced.

31. The system of claim 26, wherein the filtering component is configured to provide a greater weight to a carrier proximate to a center of the frequency band when compared to a weight provided to a carrier proximate to an edge of the frequency band.

32. The system of claim 24, wherein the filtering component is part of a receiver.

33. The system of claim 24, wherein the filtering component is part of a transmitter.

34. The system of claim 24, wherein at least one pilot carrier lies within a guardband, and an observation relating to the at least one pilot carrier that lies within the guardband is pre-defined.

35. The system of claim 34, wherein the observation relating to the at least one pilot carrier that lies within the guardband is pre-defined to be zero.

36. The system of claim 24, wherein the carriers exist within an OFDM system.

37. The system of claim 24, further comprising a trigger component that activates the filtering component upon receipt of a data packet modulated by way of 64 QAM.

38. The system of claim 24, wherein the filtering component is configured to operate exclusively in the frequency domain.

39. The system of claim 24, further comprising an analysis component configured to obtain scaled observations relating to a plurality of pilot symbols carried on a plurality of selectively scaled carriers.

40. The system of claim 24, wherein the filtering component comprises a pulse-shaping component that facilitates scaling of the at least one data carrier and the at least one pilot carrier, the pulse-shaping component existent within a transmitter.

41. The system of claim 40, wherein the pulse-shaping component employs a raised cosine filter to facilitate scaling of the at least one data carrier and the at least one pilot carrier.

42. The system of claim 24, further comprising a triggering component that activates the filtering component upon analyzing a data packet type.

43. The system of claim 24, wherein the extrapolating component extrapolates a pilot carrier from the plurality of carriers if the pilot carrier falls within a guardband and assigns a value to observations obtained from the pilot carrier.

44. The system of claim 24, further comprising an artificial intelligence component that analyzes contextual data and makes inferences regarding whether the filtering component should be activated as a function of the analysis.

45. The system of claim 24, wherein the filtering component is deactivated with respect to one or more pilot carriers proximate to a band edge.

46. A system that facilitates estimating a channel, comprising:
a component within a transmitter that receives a plurality of carriers within a band;
a pulse shaping component;
at least one memory; and
at least one processor configured to execute instructions stored in the at least one memory, the executed instructions for controlling the pulse shaping component such that the pulse shaping component facilitates shaping the plurality of carriers within the band in the frequency domain by providing power to the plurality of carriers as a function of position, based on a data type, of each of the carriers within the band in order to estimate the channel,
wherein the plurality of carriers are shaped so that carriers proximate to an edge of the band have less power than carriers proximate to a center of the band.

47. The system of claim 46, wherein the plurality of carriers comprises a plurality of pilot carriers and a plurality of data carriers.

48. The system of claim 46, wherein the pulse shaping component is configured to utilize a raised cosine filter in connection with shaping the plurality of carriers within the band.

49. The system of claim 46, wherein the plurality of carriers comprises a plurality of pilot carriers, and a number of pilot carriers ($N_p$) are scaled to a power of 2.

50. The system of claim 49, further comprising an IFFT component that performs an $N_p$ point Inverse Fast Fourier Transform upon observations obtained from the $N_p$ pilot carriers.

51. The system of claim 50, wherein the IFFT component resides within a receiver.

52. The system of claim 50, further comprising a FFT component that performs an $N_p$ point Fast Fourier Transform upon outputs of the Inverse Fast Fourier Transform.

53. The system of claim 46, wherein the pulse shaping component provides greater power to carriers proximate to a center region of the band when compared to power provided to carriers proximate to an edge of the band.

54. The system of claim 46, wherein the transmitter is configured to transmit signals using an OFDM, OFDMA, CDMA, TDMA, or GSM protocol.

55. A system that improves channel estimation with respect to flooring, comprising:
at least one memory; and
at least one processor configured to execute instructions stored in the at least one memory, the executed instructions controlling:
means for selectively scaling one or more carriers within a communications band in a frequency domain as a function of a position, based on a data type, of the one or more carriers within the communications band, the one or more carriers comprising a pilot carrier;
means for extracting an observation from the pilot carrier; and
means for determining a channel estimate as a function of the extracted observation,
wherein the pilot carrier is scaled to have less power when the pilot carrier is proximate to an edge of the band than when the pilot carrier is proximate to a center of the band.

56. The system of claim 55, wherein the:
means for extracting extracts a plurality of observations from a plurality of selectively scaled pilot carriers within the communications band.

57. The system of claim 56, wherein the executed instructions further control means for uniformly-spacing the plurality of pilot carriers with respect to frequency within the communications band.

58. The system of claim 56, wherein the executed instructions further control means for estimating the plurality of pilot carriers in time.

59. The system of claim 56, wherein the means for selectively scaling one or more carriers is included in a receiver.

60. The system of claim 59, wherein the executed instructions further control means for multiplying the plurality of pilot carriers by values chosen according to position of the pilot carriers within the band.

61. The system of claim 56, wherein the means for selectively scaling one or more carriers is included in a transmitter.

62. The system of claim 61, wherein the executed instructions further control means for utilizing a raised cosine filter to selectively scale the pilot carriers.

63. The system of claim 56, wherein the executed instructions further control means for linearly transforming the extracted observations.

64. The system of claim 56, wherein the executed instructions further control:
means for performing an Inverse Fast Fourier Transform upon the extracted observations; and
means for generating a corresponding output.

65. The system of claim 64, wherein the executed instructions further control means for performing a Fast Fourier Transform upon the output.

66. The system of claim 56, wherein the executed instructions further control:
means for determining that a subset of the plurality of pilot carriers exist within a guardband; and
means for assigning a value to a subset of observations that correspond to the subset of pilot carriers.

67. The system of claim 66, wherein the executed instructions further control means for assigning a value of zero to the subset of observations.

68. The system of claim 56, wherein the executed instructions further control means for more highly weighting a carrier proximate to a center of the band than a carrier proximate to an edge of the band.

69. The system of claim 55, wherein the executed instructions further control:
means for detecting a data packet type associated with the extracted observation; and
means for determining whether to selectively scale the one or more carriers as a function of the detected data packet type.

70. The system of claim 69, wherein the detected data packet type is a 64 QAM data packet type.

71. An apparatus comprising:
a processor; and
a computer-readable medium having code for estimating a channel, the code comprising instructions for:
scaling a plurality of carriers in a frequency domain as a function of location, determined based on a data type, of each of the plurality of carriers within a band, the plurality of carriers comprises a pilot carrier and a data carrier;
determining locations of the pilot carrier within the band; and
extrapolating an observation from the pilot carrier used to estimate a channel,
wherein the data carrier and the pilot carrier are scaled to have less power when they are proximate to an edge of the band than when they are proximate to a center of the band, and the processor is configured to execute the instructions.

72. The apparatus of claim 71, the instructions further comprising:
determining that the pilot carrier exists within a guardband; and
assigning a pre-defined value to the observation.

73. The apparatus of claim 72, the instructions further comprising assigning a value of zero to the observation corresponding to the pilot carrier.

74. The apparatus of claim 71, the instructions further comprising estimating a channel as a function of the extracted observation.

75. The apparatus of claim 71, further comprising:
a receiver, wherein the processor comprises a portion of the receiver.

76. An apparatus for facilitating a channel estimate in a wireless communication system, the apparatus comprising:
at least one memory; and
a microprocessor configured to execute instructions stored in the at least one memory for generating a channel estimate, the instructions comprising the steps of:
selectively weighting carriers in a frequency domain as a function of position, determined based on a data type, of the respective carriers within a frequency band, the carriers comprising a pilot carrier, the pilot carrier being weighted to have less power when the pilot carrier is proximate to an edge of the band than when the pilot carrier is proximate to a center of the band;
extracting an observation from the pilot carrier; and
linearly transforming the observation to facilitate estimating a channel.

* * * * *